(12) United States Patent
Yavets-Chen

(10) Patent No.: US 11,061,045 B2
(45) Date of Patent: Jul. 13, 2021

(54) SAMPLE ANALYSIS SYSTEM AND METHOD

(71) Applicant: Picodya Technologies Ltd., Rehovot (IL)

(72) Inventor: Yehuda Yavets-Chen, Kfar Vitkin (IL)

(73) Assignee: Picodya Technologies Ltd., Rehovot (IL)

( * ) Notice: Subject to any disclaimer, the term of this patent is extended or adjusted under 35 U.S.C. 154(b) by 314 days.

(21) Appl. No.: 16/299,234

(22) Filed: Mar. 12, 2019

(65) Prior Publication Data
US 2020/0292568 A1    Sep. 17, 2020

(51) Int. Cl.
*G01N 35/10* (2006.01)
*G01N 35/00* (2006.01)
(Continued)

(52) U.S. Cl.
CPC ... *G01N 35/1002* (2013.01); *G01N 35/00584* (2013.01); *G01N 35/04* (2013.01);
(Continued)

(58) Field of Classification Search
CPC ..... B01L 2300/0636; B01L 2300/0819; B01L 2300/0822; B01L 2400/0487; B01L 3/0268; B01L 9/52; G01N 2035/00237; G01N 2035/0443; G01N 2035/1034; G01N 2035/1044; G01N 2035/1058;
(Continued)

(56) References Cited

U.S. PATENT DOCUMENTS

| 5,932,877 A | 8/1999 | Braig et al. |
| 2004/0020515 A1 | 2/2004 | Tolosko et al. |

(Continued)

FOREIGN PATENT DOCUMENTS

| EP | 1746168 | 1/2007 |
| WO | WO95/11454 | 4/1995 |
| WO | WO03/072258 | 9/2003 |

OTHER PUBLICATIONS

Paratial International Search Report for PCT Application No. PC/IL2020/050288 dated Jun. 26, 2020.
(Continued)

*Primary Examiner* — Jennifer Wecker
(74) *Attorney, Agent, or Firm* — Pearl Cohen Zedek Latzer Baratz LLP

(57) ABSTRACT

A matrix droplet extruder includes one or a plurality of reagent containers. Pneumatic connectors are each connectable to a corresponding docking station connector of a docking station that is connectable to a pneumatic generator controllable by a controller to provide pneumatic pressure to the pneumatic docking station connectors. A droplet matrix extrusion surface includes an array of perforations. A liquid management chip has a network of dispensing channels for dispensing reagents from reagent containers through the array of perforations. A pneumatic control network includes pneumatic channels and gates that are controllable by application of the pneumatic pressure to the gates via the pneumatic channels to enable or block dispensing the one or more reagents to repeatedly generate a matrix of droplets when applying the pneumatic pressure to the reagents.

8 Claims, 10 Drawing Sheets

(51) Int. Cl.
*G01N 35/04* (2006.01)
*B01L 9/00* (2006.01)

(52) U.S. Cl.
CPC ......... *B01L 9/52* (2013.01); *B01L 2400/0487* (2013.01); *G01N 2035/0443* (2013.01); *G01N 2035/1044* (2013.01); *G01N 2035/1058* (2013.01)

(58) Field of Classification Search
CPC ....... G01N 35/00029; G01N 35/00584; G01N 35/04; G01N 35/1002; G01N 35/1074
See application file for complete search history.

(56) References Cited

U.S. PATENT DOCUMENTS

| | | |
|---|---|---|
| 2004/0202994 A1 | 10/2004 | Timperman |
| 2004/0203173 A1* | 10/2004 | Peck ................. B01L 3/0268 506/7 |
| 2004/0209354 A1 | 10/2004 | Mathies et al. |
| 2009/0042281 A1 | 2/2009 | Chang et al. |
| 2010/0285975 A1 | 11/2010 | Mathies et al. |
| 2011/0311980 A1 | 12/2011 | Pollack et al. |
| 2012/0177543 A1 | 7/2012 | Battrell et al. |
| 2015/0260621 A1 | 9/2015 | Scott et al. |
| 2016/0274097 A1 | 9/2016 | Megede |
| 2018/0252621 A1 | 9/2018 | Angros |

OTHER PUBLICATIONS

International Search Report for PCT Application No. PC/IL2020/050288 dated Oct. 22, 2020.

* cited by examiner

SAMPLE ANALYSIS SYSTEM AND METHOD

FIELD OF THE INVENTION

The present invention relates to a sample analysis system and method.

BACKGROUND OF THE INVENTION

In many cases, rapid receipt of test results is important for a timely medical diagnosis. Different approaches have been used to facilitate attaining of timely results. Large, automated laboratories may enable rapid testing of large numbers of samples. However, a test sample (e.g., of blood, saliva, or another tested material) must be transported to the laboratory from a local clinic or other facility. Point-of-care (POC) testing generally refers to diagnostic tests that are performed outside of a central laboratory, e.g., at a health care clinic or other facility where a patient is present. Over the years, the increasing availability of transportable, portable, and, in some cases, handheld instruments have resulted in the migration of POC testing from the hospital environment to a range of medical environments including the workplace, home, disaster care facilities, and local clinics.

Use of POC testing affects many types of diagnostics, including infectious diseases, autoimmune conditions, allergies, cancer, cardiac disease, bowel diseases, and more.

A typical POC testing device provides a single diagnostic test for a single sample. However, in many scenarios, a panel of diagnostic tests is required. Therefore, use of such single-test typical POC testing devices may require a clinic to acquire and maintain a wide variety of different POC devices.

SUMMARY OF THE INVENTION

The following embodiments and aspects thereof are described and illustrated in conjunction with systems, tools and methods which are meant to be exemplary and illustrative, not limiting in scope.

There is thus provided, in accordance with an embodiment of the invention, a matrix droplet extruder including: a casing; one or a plurality of reagent containers; a plurality of pneumatic connectors on the casing that are each connectable to a corresponding docking station connector of a plurality of pneumatic docking station connectors of a docking station that is connectable to a pneumatic generator controllable by a controller to controllably provide pneumatic pressure to one or more of the plurality of the pneumatic docking station connectors; a droplet matrix extrusion layer with an array of perforations; and a liquid management chip having a network of dispensing channels for dispensing one or more reagents from the one or a plurality of reagent containers through the array of perforations, and a pneumatic control network including pneumatic channels and gates that are controllable by application of the pneumatic pressure to the gates via the pneumatic channels to enable or block dispensing the one or more reagents to repeatedly generate a matrix of droplets when applying the pneumatic pressure to the one or more reagents.

Furthermore, in accordance with an embodiment of the invention, the droplet matrix extrusion surface includes a pattern for allowing mixing of two or more droplets.

Furthermore, in accordance with an embodiment of the invention, the matrix droplet extruder includes a reservoir for holding a cleaning fluid.

Furthermore, in accordance with an embodiment of the invention, the droplet matrix extrusion surface includes a cleaning fluid inlet for enabling the cleaning fluid to flow from the reservoir to the droplet matrix extrusion surface and a cleaning fluid outlet to enable the cleaning fluid to flow from the droplet matrix extrusion surface to a waste fluid reservoir of the matrix droplet extruder.

Furthermore, in accordance with an embodiment of the invention, a reagent container of the plurality of reagent containers is configured to hold a reagent canister of a reagent to fill that reagent container.

There is further provided, in accordance with an embodiment of the invention, a matrix droplet generator including: a pneumatic pressure generator; a controller to control the pneumatic pressure generator; a docking station having a plurality of pneumatic docking station connectors connected to the pneumatic pressure generator; and a matrix droplet extruder including: a casing; one or a plurality of reagent containers; a plurality of pneumatic connectors on the casing that are each connectable to a corresponding docking station connector of the plurality of pneumatic docking station connectors to controllably provide pneumatic pressure to one or more of the plurality of the pneumatic docking station connectors; a droplet matrix extrusion surface with an array of perforations; and a liquid management chip having a network of dispensing channels for dispensing one or more reagents from the one or a plurality of reagent containers through the array of perforations, and a pneumatic control network including pneumatic channels and gates that are controllable by the pneumatic pressure to enable or block dispensing the one or more reagents using the pneumatic pressure to repeatedly generate a matrix of droplets.

Furthermore, in accordance with an embodiment of the invention, the controller is configured to control a period of time during which pressure is applied by the pressure generator to a pneumatic connector of the plurality of pneumatic connectors.

Furthermore, in accordance with an embodiment of the invention, the controller is configured to control a pressure that is applied by the pressure generator to a pneumatic connector of the plurality of pneumatic connectors.

There is further provided, in accordance with an embodiment of the invention, a sample analysis device including: a pneumatic actuator that is connected to a plurality of pneumatic connectors, the pneumatic actuator controllable to selectively apply suction or atmospheric pressure to each pneumatic connector of the plurality of pneumatic connectors so as to cause a flow of one or more liquids within a sample holder that is connected to the pneumatic connectors, the sample holder including a plurality of liquid containers and a plurality of conduits for conducting a liquid from each liquid container to a substrate onto which is introduced a sample that is loaded into the sample holder; a controller that is configured to control the pneumatic actuator so as to sequentially cause one or more liquids from one or more of the liquid containers to flow to the sample in the sample holder; and an analysis module for examining the sample after contact of the sample with a plurality of dots of one or more reagents that are extruded onto the substrate.

Furthermore, in accordance with an embodiment of the invention, the device includes a transport mechanism to transport one or a plurality of the sample holders sequentially to a station of a plurality of stations along the transport mechanism, the controller further configured to control the transport mechanism so as to cause the transport mechanism to move the one or more sample holders such that each of the one or plurality of sample holders is sequentially moved from a current station of the plurality of stations to a next station of the plurality of stations.

Furthermore, in accordance with an embodiment of the invention, the transport mechanism includes a rotatable carousel, the plurality of pneumatic connectors arranged to enable connection of each of the sample holders at a position on the perimeter of the carousel.

Furthermore, in accordance with an embodiment of the invention, the plurality of pneumatic connectors are arranged to enable connection of the one or more sample holders at equally spaced positions along the perimeter of the carousel.

Furthermore, in accordance with an embodiment of the invention, the device includes a loading mechanism configured to hold at least one sample holder until each of the at least one sample holder is connected to the transport mechanism.

Furthermore, in accordance with an embodiment of the invention, the plurality of stations includes at least one docking station onto which a matrix droplet extruder is attachable, the docking station including a plurality of docking station connectors for connecting to a plurality of docking pneumatic connectors of the matrix droplet extruder, the docking station controllable by the controller to selectively apply pressure to each of the docking station connectors to control extrusion of liquid droplets from one or more reagent containers of the matrix droplet extruder onto a droplet matrix extrusion surface of the matrix droplet extruder to form the plurality of reagent droplets.

Furthermore, in accordance with an embodiment of the invention, the docking station includes a mechanism for emptying a canister of a reagent into a reagent container of the one or more reagent containers.

Furthermore, in accordance with an embodiment of the invention, the device includes a mechanical system that is controllable by the controller to manipulate the substrate of each of the one or plurality of sample holders to place the substrate in contact with the droplet matrix extrusion surface to enable extrusion of the plurality of reagent dots onto the substrate, and to expose the substrate to the analysis module.

Furthermore, in accordance with an embodiment of the invention, the mechanical system is controllable via application of pneumatic pressure.

Furthermore, in accordance with an embodiment of the invention, the mechanical system includes a rinsing chamber that is placeable against the droplet matrix extrusion surface to enable cleaning of the droplet matrix extrusion surface.

Furthermore, in accordance with an embodiment of the invention, the analysis module includes an optical system for acquiring an image of the substrate or an electronic system to measure an electrical property of the substrate.

Furthermore, in accordance with an embodiment of the invention, the substrate includes the dots of one or more reagents are pre-extruded onto the substrate.

There is further provided, in accordance with an embodiment of the invention, a method of operation of a sample analysis device, the method including: receiving onto a transport mechanism of the device a sample holder that includes a plurality of liquid containers and a plurality of conduits for conducting a liquid from each liquid container to a substrate onto which is introduced a sample that is loaded into the sample holder; until a process for processing the sample is complete, the process including controlling operation of the transport mechanism to successively advance the sample holder to successive stations along the transport mechanism; at each of the successive stations, controlling one or more components of the device to perform a step of the process, at least one step of the process including operating a matrix droplet extruder to extrude a matrix of droplets of including one or more reagents onto the substrate, and at least one step including analysis of the substrate by an analysis module of the system; and controlling the transport mechanism to eject the sample holder when all steps of the process are completed.

BRIEF DESCRIPTION OF THE DRAWINGS

In order for the presented invention, to be better understood and for its practical applications to be appreciated, the following Figures are provided and referenced hereafter. It should be noted that the Figures are given as examples only and in no way limit the scope of the invention. Like components are denoted by like reference numerals.

Figure 1:
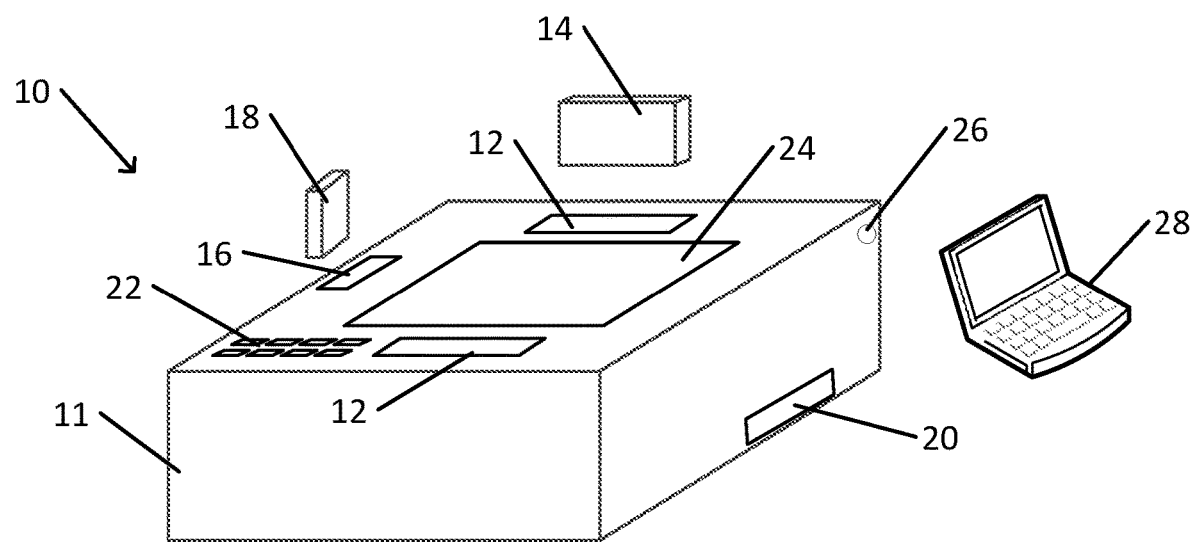
FIG. 1 schematically illustrates a multiple sample analysis device, in accordance with a possible embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with at least certain embodiments of the present invention, an analysis or diagnostic system (e.g., a point-of-care system) may be configured to enable non-automated or automated sequential chemical, biochemical, and/or other analysis and/or testing of one of more (e.g. multiple) samples. For example, a sample may include a substance derived from a person or animal (e.g., blood, saliva, urine, feces, or other type of material drawn from, or discharged or secreted by, a human or animal patient), from an environment (e.g., water or other liquids, precipitation, mud or soil, a material extracted from or secreted by a plant, or other materials found in an environment), from industrial products (foodstuffs, fuels, lubricants, pharmaceuticals, cleaning and maintenance products, beauty products, materials produced for industrial product, or other industrial products), and/or other types of substances or refined liquids.

It should be noted that reference is made herein to POC applications, systems, devices, and methods by way of example only. A system, device, or method as described herein may be used or applied in settings other than a medical clinic or similar setting. For example, devices, systems, and methods as described herein may be used in central laboratories, in a factory (e.g., for industrial or manufacturing applications), in the field (e.g., for environmental, geological, biological, resource exploration, or other applications), in a police laboratory (e.g., for forensic applications), or elsewhere. Reference herein to point-of-care should be understood, therefore, as being equally applicable to any other setting or application.

In order that a testing system may function effectively as a point-of-care diagnostics system, the system may be arranged follow an approved standard analysis protocol, e.g., meet Clinical Laboratory Improvement Amendments (CLIA) standards, enzyme-linked immunosorbent assay (ELISA) protocol, DNA/RNA testing protocols, or another approved protocol, as well as meeting standards for prevention of mixing of samples from different patients.

In addition, the system may be configured so as to prevent misuse by the user (e.g., improper insertion of a sample or improper application of a test to a sample). A test that may be performed by a system may not necessarily require an excessive amount of time (e.g., no more than 10 minutes to 20 minutes). In many cases, a qualitative (e.g., yes/no, positive/negative, present/not present, or similar) response may be sufficient and may be preferable to a quantitative response in some cases.

Each sample may be spread onto a substrate, such as a membrane, on a possible slide of a separate sample holder. The sample holder may be a single use device that may be discarded or disposed of after application of a test protocol to the sample.

For example, the sample holder may include one or more openings to enable introduction of a liquid sample into the sample holder. For example, each opening may open into an internal capillary for drawing a liquid sample, e.g., a drop of blood, or another liquid sample, into the sample holder. A user, e.g., healthcare professional or laboratory technician, a patient trained for self-testing, or other user, may identify the sample holder, e.g., by scanning a barcode, radiofrequency identification (RFID) tag, or otherwise, and may be matched with the inserted sample (e.g., patient identifier). The user may also input into the system, or otherwise specify, a test protocol for application to a particular sample in the identified sample holder.

The sample holder may be configured to apply to the sample a processing protocol of one or more steps. Typically, the protocol may include placing the sample into contact with a droplet matrix extrusion surface of a matrix droplet extruder. For example, the slide may be mechanically removed from the sample holder and pressed against the droplet matrix extrusion surface.

When the droplet matrix extrusion surface is in contact with the sample, or prior to contact, the matrix droplet extruder extrudes a matrix of reagent dots onto the droplet matrix extrusion surface via a corresponding array of perforations that open out of the matrix droplet extruder at the droplet matrix extrusion surface. The selection of reagents in each matrix of reagent droplets that is extruded may be specific to a particular test protocol. The matrix droplet extruder may be configured to include a plurality of liquid reservoirs.

The matrix droplet extruder may include a microfluidic channeling system that may be controllable to channel a liquid from one or more of the liquid reservoirs to a particular opening of an array of micro-openings or perforations in the droplet matrix extrusion surface. The channeled liquid may be extruded via the opening onto a predetermined position on the droplet matrix extrusion surface to form a reagent dot that is brought into contact with the sample on the slide substrate of the sample holder.

The processing protocol may typically be configured to result in an optically or electronically detectable result that is indicative of the results of application of the analysis protocol (e.g., presence of a particular substance, such as an antigen, in the sample). For example, the analysis protocol may be configured to change a color or fluorescence of a region of the sample slide that comes into contact with one or more of the reagent dots, the color being indicative of the composition of the sample. Alternatively or in addition, the region of the sample slide that comes into contact with one or more of the reagent dots may fluoresce with a particular color that is indicative of the composition of the sample.

Alternatively or in addition, the region of the sample slide that comes into contact with one or more of the reagent dots may be characterized by one or more changes in electrical properties that are indicative of the composition of the sample. For example, the processing protocol may include an immunoassay protocol, e.g., an enzyme-linked immunosorbent assay (ELISA) protocol, in which a sample is exposed to one or more antibodies or enzymes in order to detect the presence of one or more antigens in the sample.

In at least some examples, a multiple sample diagnostic system may be provided that may include an integrated transport and control mechanism for transporting several sample holders, each to one or more of a plurality of stations. The transport and control mechanism may be configured to concurrently transfer all of the sample holders from one station to a next station, in succession. For example, the transport mechanism may include a linear or circular conveyor or carousel. In a case of circular carousel, the sample holders may be arranged along a perimeter of the carousel. In some cases, such a carousel may be configured to concurrently transport a maximum of eight sample holders (e.g., corresponding to a maximum number of processing steps in typical ELISA protocols), or another number of sample holders.

Each sample holder may include a plurality of pneumatic connectors that may be arranged to connect with corresponding connectors on the transport mechanism when the sample holder is inserted into the transport mechanism. The connectors may typically be connected to a pressurized pneumatic source or to a vacuum pump or other suction source via an arrangement of pneumatic channels and valves. Each sample holder may also include one of more filters, reservoirs of one or more materials, typically liquids, and/or other structure(s).

When the sample holder is positioned at some of the stations, the valves may be operated to cause movement of a quantity of liquid within the sample holder. For example, a sample of blood may be drawn through a filter arrangement in order to obtain blood plasma or serum that is suitable for testing. A liquid may be drawn from one or more of the reservoirs through to the sample on the substrate of the slide to perform a wet process procedure of a protocol (e.g., wash, blocking, or other step).

The transport mechanism may be configured such that each sample holder remains at each station for a period of time that is sufficient to enable completion of a step of a processing protocol on each of the samples. For example, in many cases, a period of one minute may be sufficient to perform the longest steps of typical analysis protocols.

The diagnostic system may include one or more (e.g., two) docking stations to each of which a matrix droplet extruder may be connected (e.g., at the beginning of a work day, or otherwise). When, during operation of some protocols, a sample holder is brought to a processing station that includes a matrix droplet extruder, the sample substrate of that sample holder may be pressed (e.g., after possible removal of the sample slide from the sample holder) against the droplet matrix extrusion surface of that matrix droplet extruder. Thus, the sample may be brought into contact with an array of reagents such that the reagents are printed onto the sample at known positions.

When all steps of the analysis protocol are completed on a sample in a sample holder, application of the protocol may result in one or more optically assessable results. For example, a color of a region of the sample that was brought into contact with a dot of reagent at a known position on the matrix droplet extruder may be altered, or fluorescence of the sample may be altered. In some cases, electrical properties of the sample, e.g., resistance or conductivity, dielectric constant, or another electrical property of the sample, may be altered.

It may be noted that, in this manner, the composition of each reagent dot is known by its position. Therefore, it is not necessary that each type of reagent be distinguished from the others by a distinctly detectable effect (e.g., by different detectable colors or electrical properties), as would be necessary in a system where the reagents are not spatially separated from one another and/or formed in a pre-determined scheme possibly determined by the a pre-defined array of perforations that open out of the matrix droplet extruder at the droplet matrix extrusion surface.

After completion of all steps of an analysis protocol on a sample in a sample holder, the transport mechanism may bring that sample holder to a station that includes an analysis module. For example, the analysis module may include an imaging device (e.g., camera), illumination sources, and appropriate optics for detecting any optical effects, e.g., coloring or fluorescence, of a processing protocol on the sample in the sample holder.

An image of the sample may be acquired (e.g., after removal of the sample slide from the sample holder to a viewing area of the analysis module), and the image, or a result of analysis of the image, may be displayed or otherwise outputted or communicated to a user. In some cases, an image or result may be stored or transmitted to another device for later review, analysis, or comparison. The analysis module may include electronics components for measuring electrical properties of the processed sample.

After imaging or analysis by the analysis module, an ejection mechanism may remove the sample holder from the transport mechanism. For example, the ejection mechanism may be configured to disconnect the sample holder from the transport mechanism. An inclined slide or other structure may be configured such that an ejected sample holder may be removed from the transport mechanism by a distance that is sufficient to prevent the ejected sample holder from interfering with function of the transport mechanism or of other components of the diagnostic system.

The transport mechanism may cooperate with a loading mechanism for loading sample holders onto the transport mechanism. In some cases, the loading mechanism may be configured to hold one or more sample holders until a vacancy is available on the transport mechanism. For example, the loading mechanism may include a rotatable turntable, or another mechanical structure that may hold one or more sample holders (e.g., capable of holding three sample holders, or another number of sample holders) that is configured to successively place sample holders onto vacant positions on the transport mechanism as such vacant positions become available.

In some cases, a reagent dot printing system may operate as a standalone system, and not as part of a POC diagnostic device. For example, such a reagent dot printing system may include a docking station and associated controller and one or more pneumatic sources (e.g., pressure generators or sources). A matrix droplet extruder may be connected to the docking station of the reagent dot printing system. The reagent dot printing system may be configured to operate a liquid management chip of the matrix droplet extruder to controllably extrude an array of dots onto a droplet matrix extrusion surface of the matrix droplet extruder, where the matrix extrusion surface faces outward from the matrix droplet extruder.

The reagent dot printing system may be operated to print reagent dots on slides prior to their incorporation into sample holders. For example, the reagent dot printing system may be operated by a central laboratory, or by a producer of slides for a standalone sample analysis system. The reagent dot printing system may include a mechanical system for automatically placing slides against the droplet matrix extrusion surface or may enable manual manipulation of the slide to the droplet matrix extrusion surface.

A slide onto which an array of reagent dots has been printed may be stored under conditions that preserve the reagent properties of the dots until used. For example, storage conditions may include one or more of controlled temperature, controlled humidity, limited exposure to light, or other controlled conditions.

Prior to use, the slide may be inserted into a sample holder. Such a sample holder with a preprinted slide may be utilized in a standalone sample analysis system. For example, the sample analysis system may include a sample holder device that is configured to hold one or more sample holders. The sample holder device may include a controller and one or more pneumatic sources (e.g., suction pumps).

The controller may cause the flow of one or more samples or other liquid substances in order to filter a sample, to spread a sample on the slide, to expose the sample to one or more liquid substances (e.g., a wet process), or otherwise cause liquid flow within the sample holder. The sample holder device may be configured to control liquid flow in a single sample holder at any given time or may be configured to concurrently control liquid flow in two or more sample holders.

For example, a sample holder device may be smaller, simpler, and less expensive than a POC diagnostic system. In this case, a physician, field worker, or other user may use such a sample holder device, together with sample holders with slides that are preprinted using a reagent dot printing system, in a simple and efficient manner (albeit at a lower throughput rate), at a location that is remote from a clinic or other institution with a POC diagnostic system.

FIG. 1 schematically illustrates a multiple sample analysis diagnostic device, in accordance with a possible embodiment of the present invention.

Multiple sample analysis device 10 may be configured to concurrently analyze a plurality of samples. Each sample may be contained within and/or fitted to a sample holder 18. Components of multiple sample analysis device 10 may be enclosed within housing 11. Multiple sample analysis device 10 may be utilized as a POC device.

A plurality of sample holders 18 may be inserted or fitted successively into multiple sample analysis device 10 via sample holder opening 16. When analysis of a sample in a sample holder 18 is complete, that sample holder 18 may be ejected from multiple sample analysis device 10 via an ejection opening 20.

Prior to analysis of samples in sample holders 18, one or more (e.g., one or two) matrix droplet extruders 14 may be inserted or fitted into multiple sample analysis device 10. For example, one or more matrix droplet extruder openings 12 may be provided to enable insertion or coupling of a matrix droplet extruder 14. Alternatively or in addition, a cover of housing 11 may be openable to enable insertion or coupling of one or more matrix droplet extruders 14.

A matrix droplet extruder 14 may be operated to produce an array of droplets of a reagent at or upon an outwardly facing surface of extruder 14 that may be brought into contact with a sample that has been loaded into a sample holder 18. For example, a single extruded droplet may have a volume between 100 pl to 2 nl, a diameter between 20 μm to 500 μm, and a spacing between dots between 100 μm to 300 μm (e.g., 200 μm between dots of a single type of reagent, and 300 μm between different reagents), or other values.

Multiple sample analysis device 10 may include one or more user controls 22 that may be operable to control operation of multiple sample analysis device 10. Multiple sample analysis device 10 may include one or more output devices 24 to communicate a status (e.g., number of sample holders 18 currently inserted, whether or not another sample holder 18 may be inserted, error message, and/or other status), analysis results, and/or other information to a user of the multiple sample analysis device 10. For example, an output device may include one or more display screens, indicator lights, speakers and/or other audible signal generators, and/or other output devices.

Multiple sample analysis device 10 may be configured to communicate via a wired or wireless connection with an external device 28. For example, external device 28 may include a computer, terminal, or other devices that may enable input of instructions or data (e.g., patient or other identifying data associated with a sample in a sample holder 18, analysis or testing procedure or protocol to be performed on a sample in a particular sample holder 18, or other instructions), or output of data or messages (e.g., results of analysis or testing).

Electrical power for operation of multiple sample analysis device 10 may be provided via power connector 26. Typically, electrical power may be provided by a direct current (DC) power source. A DC power source may include an adapter that is connected to an alternating current power source (e.g., power mains), a battery or battery pack, solar cell, or other source of DC power (e.g., with a voltage of 24 V, or another voltage).

Figure 2:
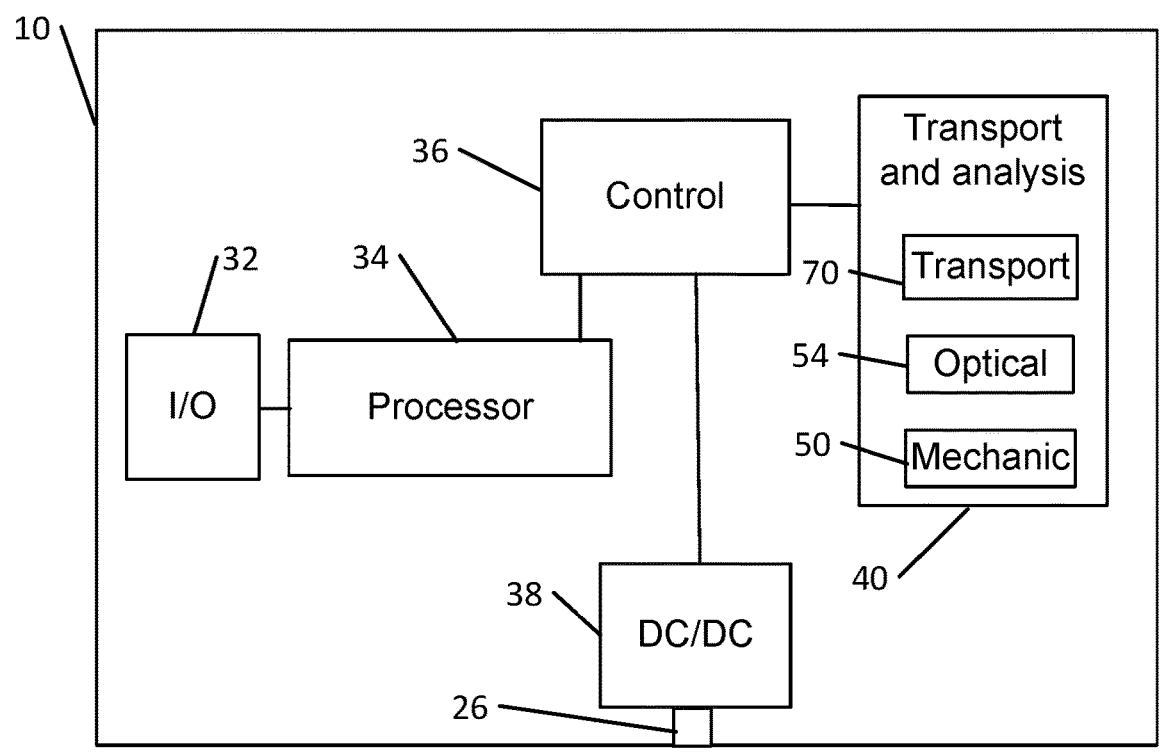
FIG. 2 is a block diagram of a multiple sample analysis device generally similar to that shown in FIG. 1.

FIG. 2 is a block diagram of the multiple sample analysis device shown in FIG. 1.

Transport and analysis system 40 may be configured to transport a sample holder 18 to a plurality of predetermined stations within transport and analysis system 40. At each station, one or more steps of an analysis process may be performed. After completion of the analysis process, matrix droplet extruder 14 may be ejected from multiple sample analysis device 10.

Operation of transport and analysis system 40 may be controlled by controller 36. Controller 36 may be configured to operate one or more components of transport and analysis system 40 in accordance with instructions that are generated by processor 34. Processor 34 may communicate with other units or devices via input/output (I/O) unit 32. For example, processor 34 may, via I/O unit 34, with one or more of a user control 22, an output device 24, and an external device 28.

Transport and analysis system 40 may include transport mechanism 70, analysis module 54, and mechanical system 50, each of which may be controlled by controller 36.

Electrical power for operating different components of transport and analysis system 40 and multiple sample analysis device 10 may be provided via DC/DC converter circuitry 38. DC/DC converter circuitry 38 may convert an input voltage from power connector 26 to an operating voltage appropriate for each component of transport and analysis system 40 or of multiple sample analysis device 10.

Figure 3A:
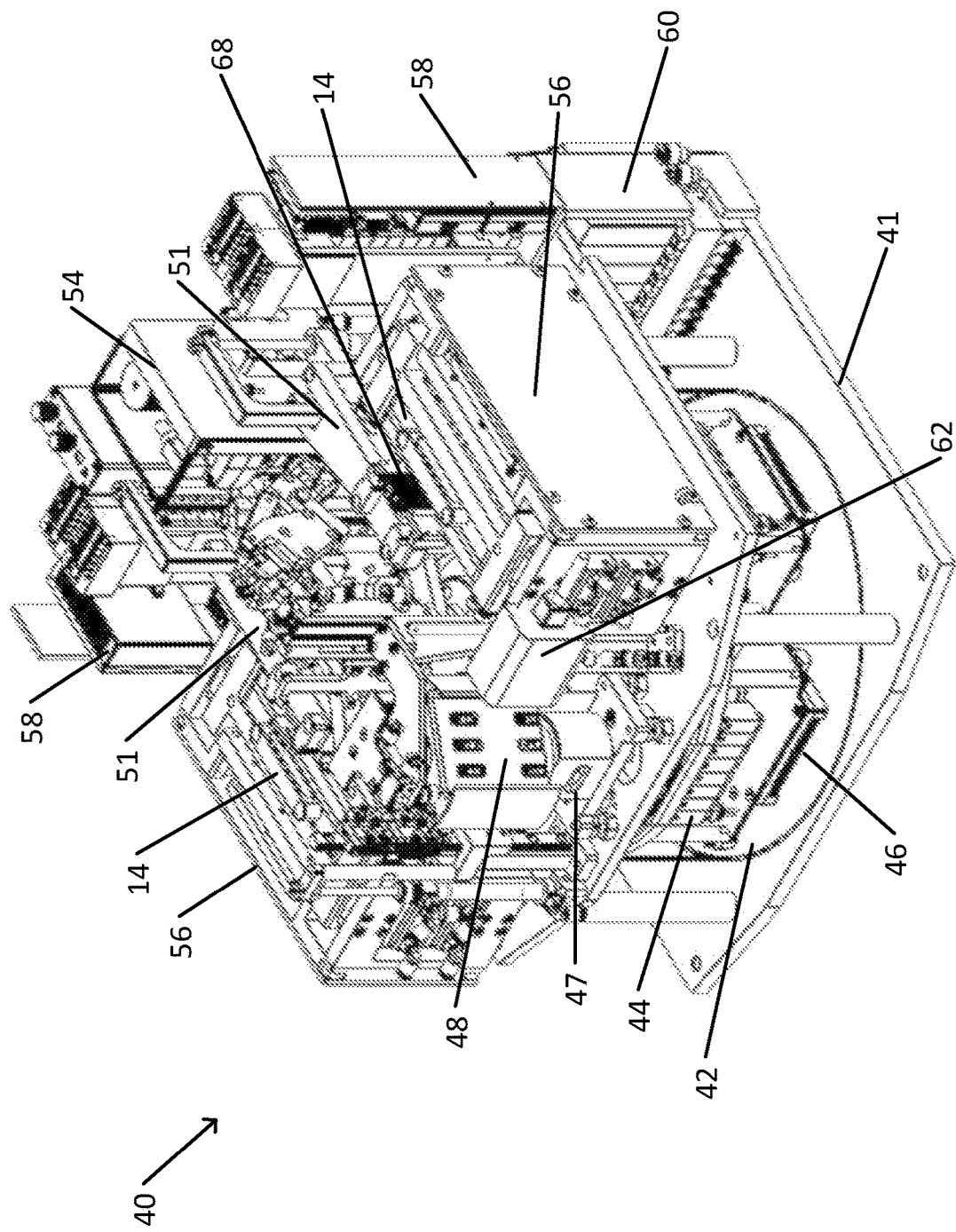
FIG. 3A schematically illustrates an example of a transport and analysis system of a multiple sample analysis device, possibly similar to that shown in FIG. 2.
Figure 3B:
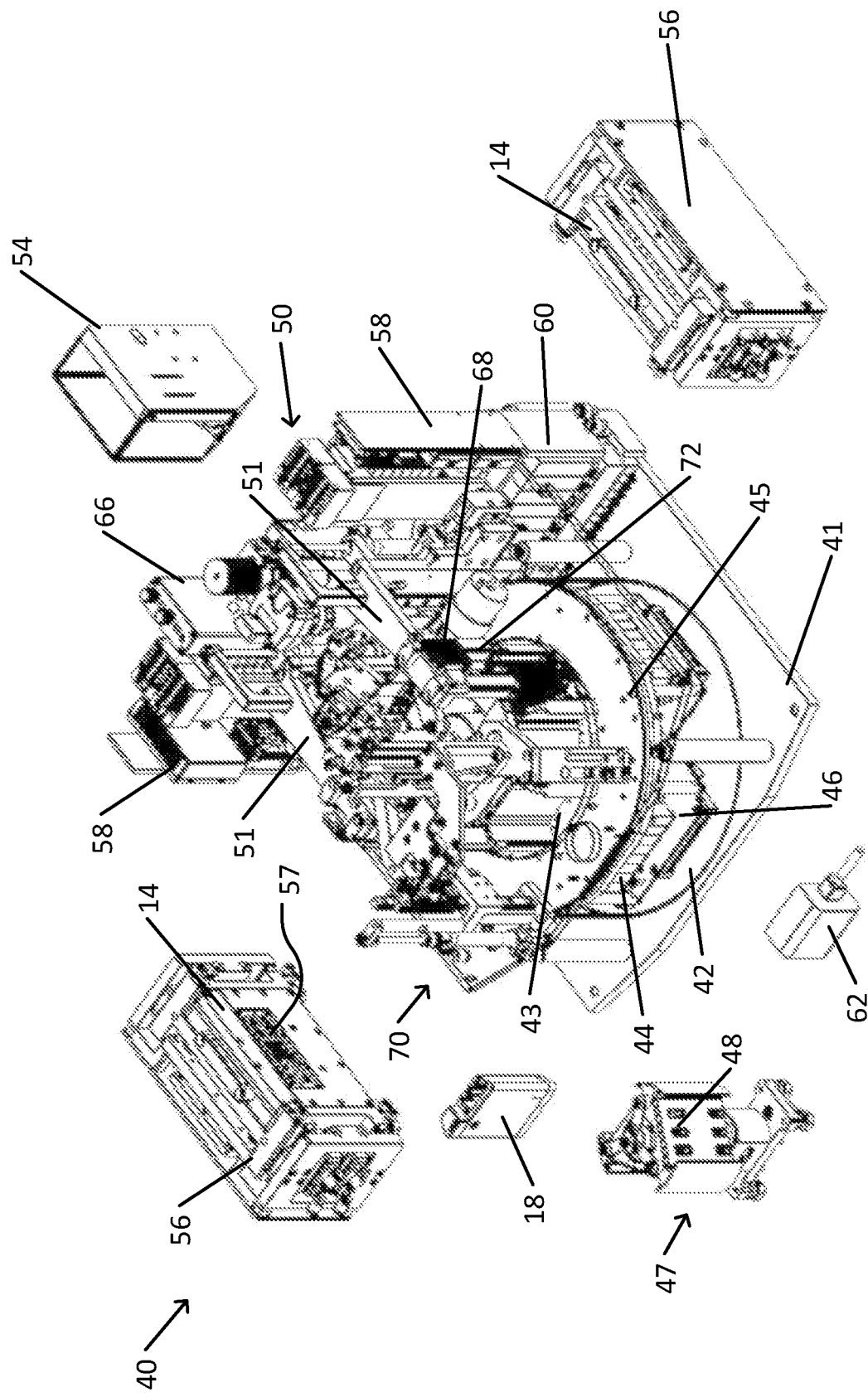
FIG. 3B is a schematic exploded view of the transport and analysis system shown in FIG. 3A.
Figure 4:
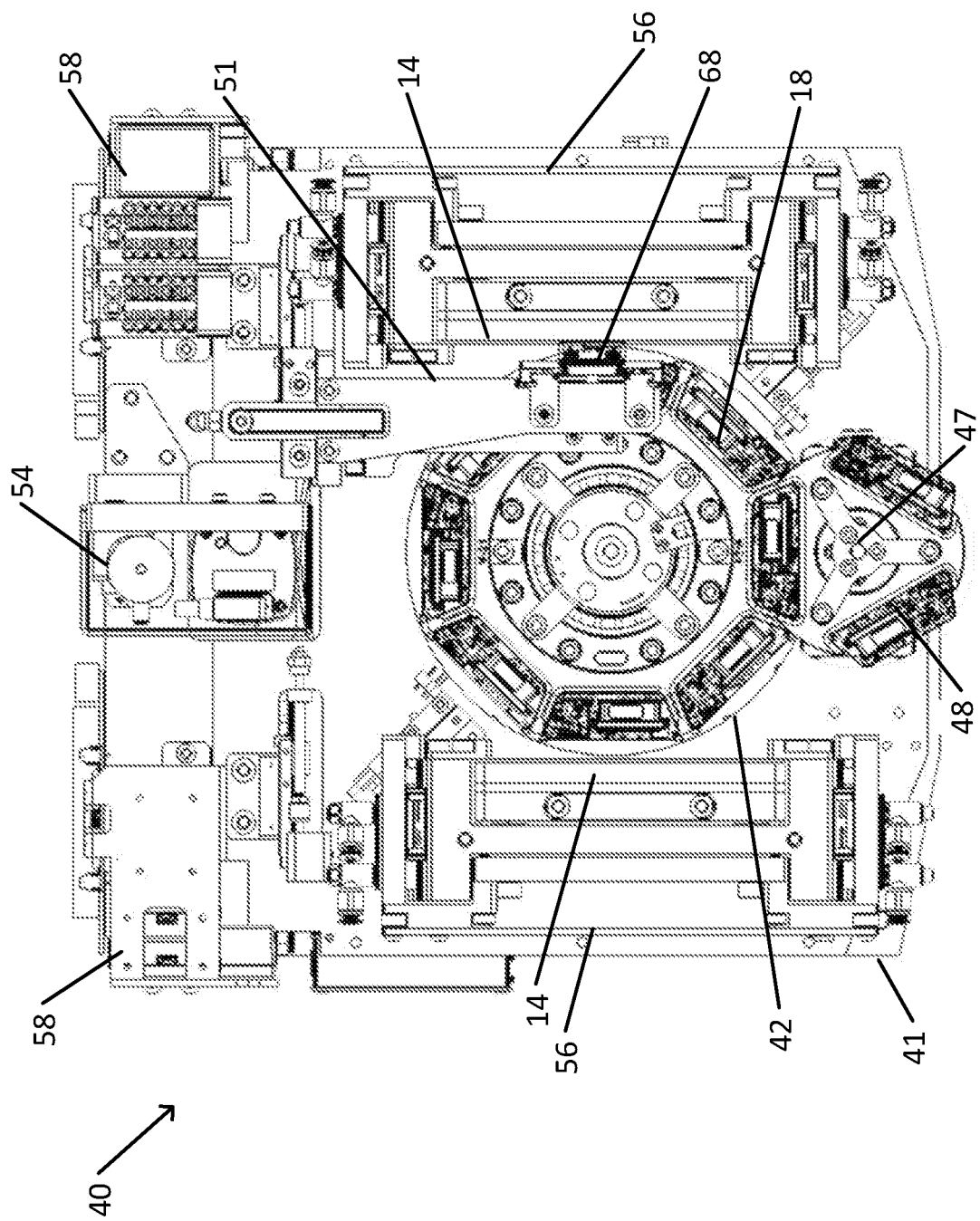
FIG. 4 is a schematic top view of the transport and analysis system shown in FIG. 3A.
Figure 5:
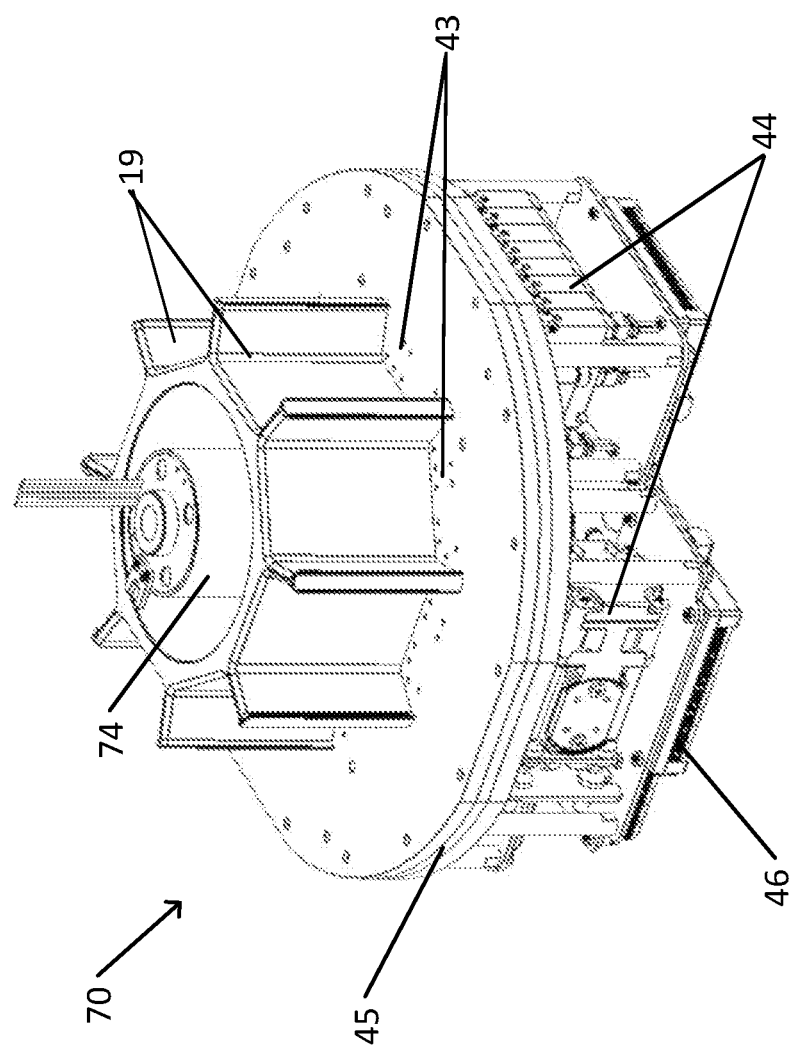
FIG. 5 schematically illustrates an example of a carousel of the transport and analysis system shown in FIGS. 3.

FIG. 3A schematically illustrates an example of a transport and analysis system of a multiple sample analysis device generally similar in principle to that shown in FIG. 2. FIG. 3B is a schematic exploded view of the transport and analysis system shown in FIG. 3A. FIG. 4 is a schematic top view of the transport and analysis system shown in FIG. 3A. FIG. 5 schematically illustrates a carousel of the transport and analysis system shown in FIG. 3A.

Components of transport and analysis system 40 of multiple sample analysis device 10 may be mounted in this optional example to system base 41. Mounting to system base 41 may enable components of transport and analysis system 40 to be positioned at predetermined positions and orientations relative to one another. Transport and analysis system 40 may be connected to controller 36, which in turn may be configured to control operation of components of transport and analysis system 40.

In the example shown, a transport mechanism 70 includes carousel 42. Carousel motor 74 may be operated to rotate carousel 42 about its axis. Carousel 42 may be configured to transport a plurality of sample holders 18, up to eight in the example shown, at eight positions arranged about the perimeter of carousel 42. Each sample holder 18 may be held by sample holder holding structure 19. Successive rotations of carousel 42 may bring each sample holder 18 to each of an equal number of stations (e.g., eight, in the example shown) that are distributed about the perimeter of carousel 42. Carousel 42 may be operated such that each sample holder 18 remains at each station for a predetermined period of time (e.g., one minute, or another period of time). Thus, in the example shown, a rotation of carousel 42 through a rotation angle of 45° may bring each sample holder 18 from one of the stations to the next station.

Loading mechanism 47 may be configured to load one or more sample holders 18 onto carousel 42. Loading mechanism 47 may include one or more sample holder slots 48. In the example shown, loading mechanism 47 includes three sample holder slots 48. For example, a sample holder 18 that may be inserted or fitted into, or coupled to, sample holder opening 16 (as depicted in FIG. 1 or 5) may be placed into a sample holder slot 48 that may be aligned or urged into correspondence with sample holder insertion opening 16.

When loading mechanism 47 includes one or more vacant sample holder slots 48, loading mechanism 47 may be rotated to align one of the sample holder slots 48 with sample holder opening 16, in order to enable insertion or coupling of another sample holder 18 into sample holder opening 16. When a sample holder 18 is removed from carousel 42 and the vacant sample holder holding structure 19 is rotated to the station that includes loading mechanism 47, a sample holder 18 may be loaded from one of the sample holder slots 48 into sample holder holding structure 19 on carousel 42. Thus, loading mechanism 47 may function as a buffer mechanism to enable efficient loading of sample holders 18 into multiple sample analysis device 10.

A sample holder 18 may be loaded into sample holder holding structure 19 on holder platform 45 to connect to a holder platform pneumatic connector set 43. The number of sets of holder platform pneumatic connectors 43 on holder platform 45 may, in some examples, define a maximal number of sample holders 18 (eight, in the example shown) that may be loaded at one time onto carousel 42.

When a sample holder 18 is loaded onto carousel 42, one or more identification markings on sample holder 18 may be read by identification reader 62. For example, identification reader 62 may include a barcode scanner, and RFID reader, or other sensor or device that may be capable of reading an identification marking on sample holder 18. Processor 34 may be configured to associate the identified sample holder 18 with a source of the sample (e.g., patient or other source) in sample holder 18, and with a possible analysis procedure that may be performed on or to the sample.

Each sample holder 18 may be configured to hold a sample of a liquid for analysis. Each sample holder may include a group of pneumatic connectors (e.g., nine, or another number) that may be configured at each sample holder position on carousel 42 to connect to (e.g., mate with) a pneumatic connector set 43 possibly including an equal number of pneumatic connectors as in the group of connectors on the holder.

Carousel 42 may include one or more pneumatic actuator systems 44 (e.g., one pneumatic actuator system 44 to operate up to two sample holders 18, in the example shown). Each pneumatic actuator system 44 may include a vacuum pump and an arrangement of conduits and valves. The number of valves in one possible example may be equal to the number of sample holder positions on carousel 42, multiplied by the number of pneumatic connectors at each sample holder position (e.g., 72 for an arrangement of eight sample holder positions and nine pneumatic connectors).

The valves may be selectively operated, e.g., by controller 36, to cause a flow of one or more liquids (e.g., of a sample liquid or a liquid from a liquid reservoir of sample holder 18) through sample holder 18. Conduits that connect a pneumatic actuator system 44 with holder platform pneumatic connectors 43 may be incorporated into holder platform 43.

Transport and analysis system 40 may include one or more (two, in the example shown) docking stations 56. A matrix droplet extruder 14 may be connected to one or more of docking stations 56. A docking station 56 may include a set of interfaces to a matrix droplet extruder 14 that is connected to that docking station 56. The interfaces may include a set of pneumatic connectors for connection of a microfluidic channeling assembly within matrix droplet extruder 14 to pneumatic actuator assembly 58.

Matrix droplet extruder 14 may include a perforated droplet matrix extrusion layer 57 (see FIG. 3B) with an outer droplet matrix extrusion surface 571 that faces outwardly from extruder 14. Typically, droplet matrix extrusion layer 57 may be formed as a flat slab of stainless steel or of another material that may be substantially nonabsorbent and cleanable. Each matrix droplet extruder 14 may be configured to extrude a matrix of reagent droplets onto droplet matrix extrusion surface 571 of droplet matrix extrusion layer 57 via an array of perforations.

Matrix droplet extruder 14 may be configured to hold a plurality of reagent containers that can be separately insertable into matrix droplet extruder 14 (e.g., in a facility for preparation of matrix droplet extruders 14, or by a user of transport and analysis system 40). A particular reagent may be conducted from one of the reagent containers (or reagent reservoirs into which contents of the reagent containers were emptied) to a particular perforation on droplet matrix extrusion surface 571 by the microfluidic channeling assembly. A configuration of the microfluidic channeling assembly may, in turn, be controlled by controller 36 via docking station 56, e.g., in accordance with a current step of a particular analysis that is to be performed on a sample in a particular sample holder 18.

For example, transport and analysis system 40 may include pressure generator 60 that is configured to generate pneumatic pressure for effecting and controlling (via the microfluidic channeling assembly) flow of reagents to droplet matrix extrusion surface 571. For example, pressure generator 60 may include one or more pressure pumps, and one or more pressure regulation valves or structure.

Mechanical system 50 may be configured to manipulate sample holders 18, and other manipulable components of transport and analysis system 40. For example, mechanical system 50 may include one or more mechanical arms 51 that may grasp and manipulate sample holders 18. Components of mechanical system 50 may be pneumatically actuated. For example, mechanical system 50 may include a pressure pump 66. A plurality of internal valves may be operated to control movement of mechanical arms 51 or of other components of mechanical system 50.

Figure 6A:
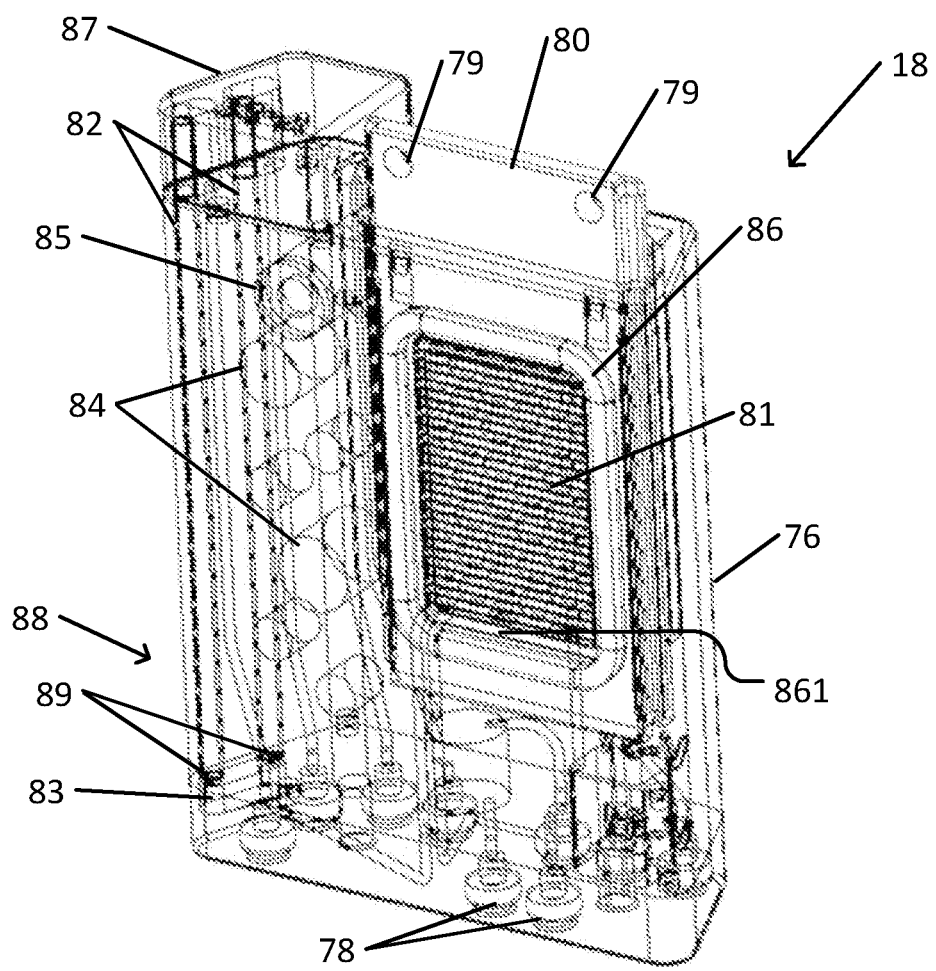
FIG. 6A schematically illustrates an example of a sample holder of a multiple sample analysis device such as that shown in FIGS. 3.

Rotation of carousel 42 may bring a sample holder 18 to a station at which a matrix droplet extruder 14 has been placed. If a sample of that sample holder 18 is to be placed in contact with a droplet matrix extrusion surface 571 of matrix droplet extruder 14, controller 36 may operate a mechanical arm 51 to lift a sample slide of that sample holder 18 out of sample holder 18 and to press the sample slide against droplet matrix extrusion surface 571. For example, grasping structure 72 of mechanical arm 51 may be configured to grasp and manipulate the slide, e.g., using structure 79 of sample slide 80 (FIG. 6A).

Typically, reagents may be extruded via perforations in droplet matrix extrusion surface 571 when the slide of sample holder 18 is in contact with droplet matrix extrusion surface 571. In this manner, evaporation of the reagent droplets prior to contact with the sample may be prevented.

After contact of the sample with droplet matrix extrusion surface 571, droplet matrix extrusion surface 571 may be cleaned to remove any traces of the sample prior to contact of another sample with droplet matrix extrusion surface 571. For example, mechanical arm 51 may include rinsing chamber 68. Rinsing chamber 68 may include a shallow (e.g., having a depth of about 100 μm) indentation whose rim includes a gasket (e.g., an O-ring or other gasket).

After removal of the slide from droplet matrix extrusion surface 571, mechanical arm 51 may press rinsing chamber 68 against droplet matrix extrusion surface 571. For example, the gasket of rinsing chamber 68 may form a seal between rinsing chamber 68 and droplet matrix extrusion surface 571. Matrix droplet extruder 14 may then be operated to fill rinsing chamber 68 with a rinsing liquid via a rinse inlet opening in droplet matrix extrusion surface 571. After rinsing chamber 68 is filled, matrix droplet extruder 14 may be operated to remove the rinsing liquid from rinsing chamber 68, e.g., via a rinse outlet opening in droplet matrix extrusion surface 571.

Alternatively or in addition to rinsing chamber 68, mechanical system 50 or a mechanical arm 51 may be provided with one or more brushes, pads, wipers, or other structure to facilitate cleaning of droplet matrix extrusion surface 571.

Typically, after application of all steps of an analysis protocol to a sample in a sample holder 18, that sample holder 18 may be rotated to a station that includes analysis module 54. For example, analysis module 54 may include one or more imaging devices, light sensors, illumination sources, or other components that enable optical evaluation of a sample in sample holder 18, e.g., after contact with an array of reagents at a droplet matrix extrusion surface 571. Analysis module 54 may include one or more electrical contacts, voltage or current sources, voltage or current meters, electronic circuitry, integrated circuits, or other components for electronic evaluation of a sample in sample holder 18, e.g., after contact with an array of reagents at a droplet matrix extrusion surface 571.

For example, when a sample holder 18 is positioned at a station that includes analysis module 54, mechanical arm 51 may be operated to lift the sample slide out of sample holder 18 and place it in a viewing position relative to analysis module 54. For example, analysis module 54 may include a lightproof chamber which may enable imaging of light reflected by or fluoresced by a sample without interference with ambient light. An acquired image of the slide, or other data, may be communicated to processor 34, to an external device 28, to both, or to another destination.

Typically, after its sample is examined by analysis module 54, a sample holder 18 may be removed from carousel 42. For example, an ejection mechanism may remove sample holder 18 from carousel 42, such that sample holder 18 exits multiple sample analysis device 10 via ejection opening 20. For example, the ejection mechanism may include, or may cooperate with, an inclined surface on which a sample holder 18 that is removed from carousel 42 may slide away from carousel 42 and out through ejection opening 20. Typically, an ejected sample holder 18 may be discarded. In some cases, the ejected sample holder 18 may be saved for further analysis.

Figure 6B:
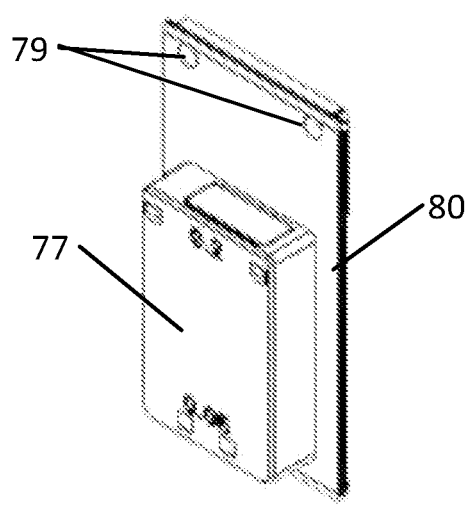
FIG. 6B schematically illustrates a chamber for applying suction to a slide in the sample holder shown in FIG. 6A.

FIG. 6A schematically illustrates a sample holder of the multiple sample analysis device shown in FIG. 1. FIG. 6B schematically illustrates a chamber for applying suction to a slide in the sample holder shown in FIG. 6A.

Components of sample holder 18 may be enclosed in holder casing 76. Holder casing 76 may be configured to connect to holder platform 45 of carousel 42. Pneumatic connectors 78 of sample holder 18 may connect to holder platform pneumatic connectors 43 on holder platform 45, and thus to pneumatic actuator system 44.

During application of some steps of an analysis process to a sample in sample holder 18, pneumatic actuator system 44 may apply suction to one or more pneumatic connectors 78, while one or more other pneumatic connectors 78 may be connected to atmospheric pressure via a breather vent. Pneumatic connectors 78 may be connected to various structures within sample holder 18 via conduit system 88. Selective application of suction and/or atmospheric pressure to pneumatic connectors 78 may cause one or more liquid substances to flow between various components of sample holder 18.

A sample may be introduced into sample holder 18 via one or more (e.g., two or another number of) openings into sample channels 82. In the example shown, sample channels 82 may be in the form of capillary tubes. For example, a sample chamber 82 in the form of a capillary tube may be suitable for a sample that includes blood. For other types of samples, other forms of sample channels may be provided. For example, other types of sample channels or holders may include an absorbent or adhesive material strip or mass, an opening directly into a widened chamber, or another type of channel or opening.

A sample may be introduced into a sample channel 82 after removal of holder cover 87. For example, a sample may include a drop of blood from a pricked finger (typically a third or fourth drop after previous droplets have been wiped away, e.g., in order to avoid contamination of the samples), or another liquid of biological or other origin. Once a sample has been loaded into sample channels 82, holder cover 87 may be replaced. Typically, after (or, in some cases, prior to) loading a sample into sample channels 82, a barcode, RFID tag, or other identifier of sample holder 18 may be scanned and associated with an origin of the sample (e.g., a particular patient), and an analysis procedure that is to be performed on the sample by multiple sample analysis device 10.

In some cases, e.g., when the sample is a blood sample, separation may be required. For example, blood analysis may require separating blood cells out of the blood in sample channels 82 to yield blood plasma. For example, suction may be applied to sample channels 82 by pneumatic actuator system 44 via pneumatic connectors 78, plasma chamber 83, and blood separator 89 to draw blood from sample channels 82 into plasma chamber 83 via blood separator 89. For example, blood separator 89 may include a filter, a microchannel, or other technique.

Structure in holder cover 87 may function as a breather vent to enable flow of the blood via blood separator 89 into plasma chamber 83. The applied suction (negative pressure) may be sufficiently weak so as to avoid hemolysis (rupture of blood cells). When the sample includes a liquid or solution that does not include biological cells or other types of suspended particles that may be removed by blood separator 89, the sample may be drawn through blood separator 89 with substantially no effect on the sample. In some cases, a sample holder 18 may be designed for such other types of samples, e.g., without a blood separator 89.

Sample holder 18 may include sample slide 80. A sample may be applied to substrate 81 of sample slide 80. For example, substrate 81 may include a membrane that is composed of, or may include, nitrocellulose, fiberglass, nano-mesh, plastic, glass, or another suitable material for absorbing a sample and other substances that may be applied to substrate 81. When substrate 81 is absorbent, since the sample, or an applied reagent, may be absorbed into substrate 81 orthogonally to its surface, the concentration of the absorbed sample or reagent per unit area may be greater than would be possible for a nonabsorbent surface.

A substance to be applied to substrate 81, e.g., a sample in sample channels 82, plasma chamber 83, or a liquid substance that is held in one or more of liquid containers 84, may be drawn into sealed space 861 between a section of holder casing 76 that is bounded by sealing gasket 86, and a section of sample slide 80 that includes substrate 81. The dimensions of sealed space 861 may be designed to encourage laminar flow of the sample or other liquids (e.g., to facilitate even application of the liquid to substrate 81.

In some cases, suction may be applied to sealed space 861 while a source of applied substance is opened to a breather vent, both via pneumatic connectors 78. Once sealed space 861 has been filled by the substance, suction may be applied via chamber 77 (see FIG. 6B) to the side of substrate 81 that is opposite the side that is exposed to sealed space 861, while sealed space 861 is opened to a breather vent via a pneumatic connector 78. Thus, the substance that fills sealed space 861 may be drawn into substrate 81, thus expediting absorption of the substance into substrate 81.

Figure 7A:
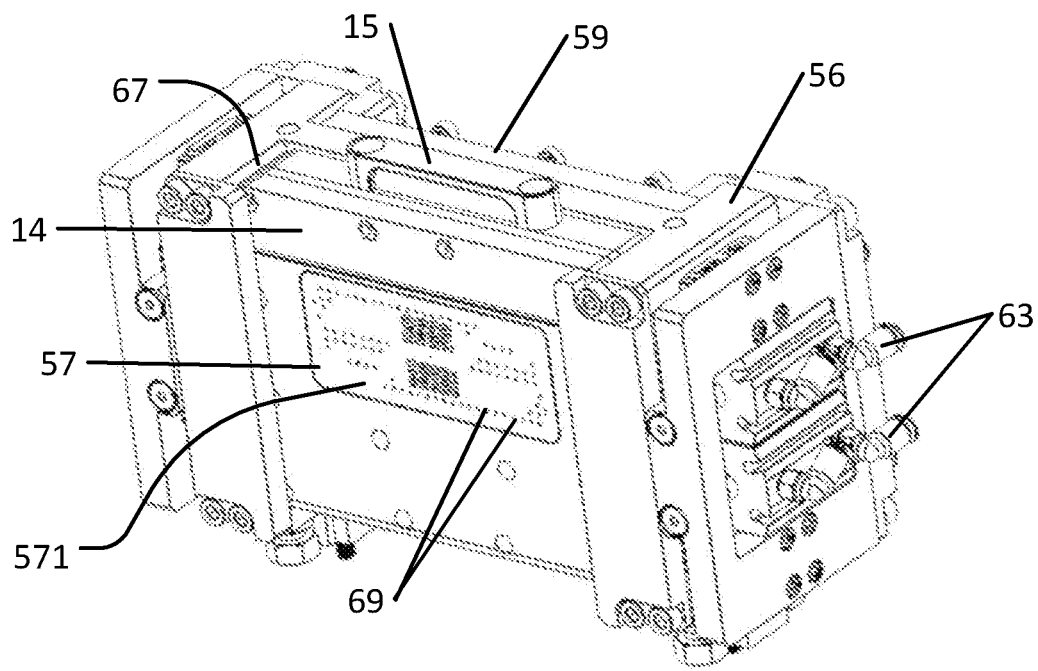
FIG. 7A schematically illustrates an example of a matrix droplet extruder inserted into an example of a docking station, possibly suitable for use with a transport and analysis system such as that shown in FIG. 3A.
Figure 7B:
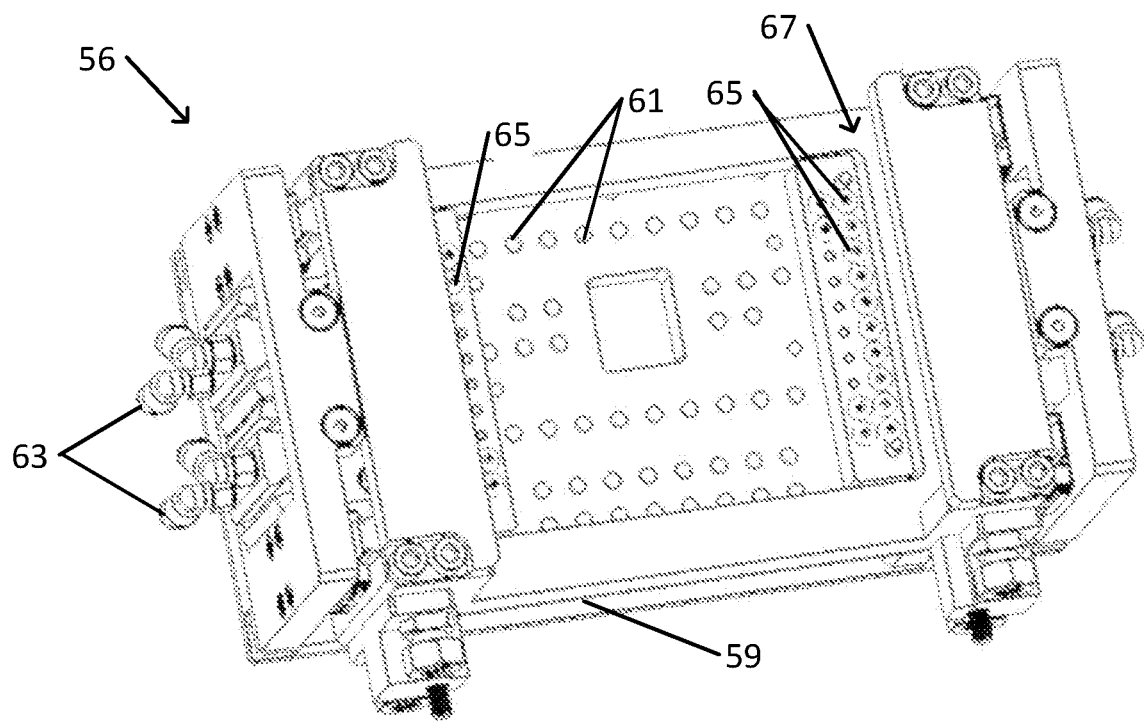
FIG. 7B is a schematically illustrates the docking station shown in FIG. 7A.
Figure 7C:
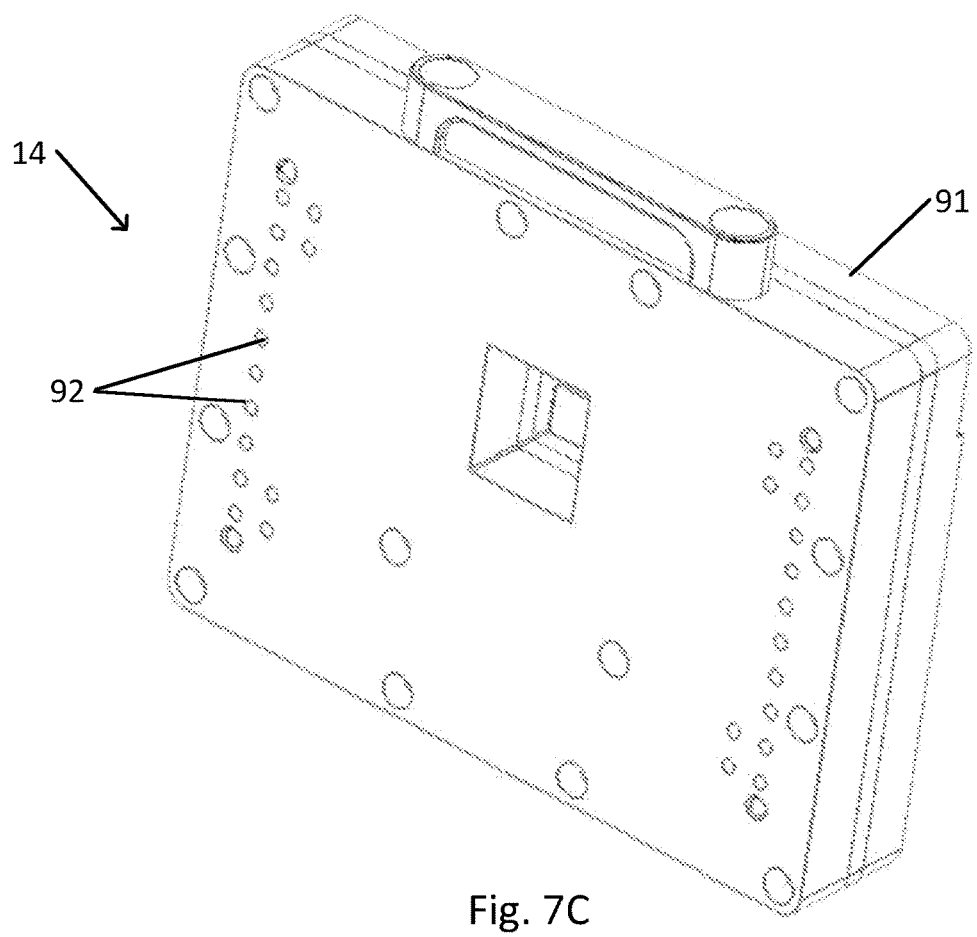
FIG. 7C schematically illustrates a rear side of a matrix droplet extruder, such as that shown in FIG. 7A.
Figure 7D:
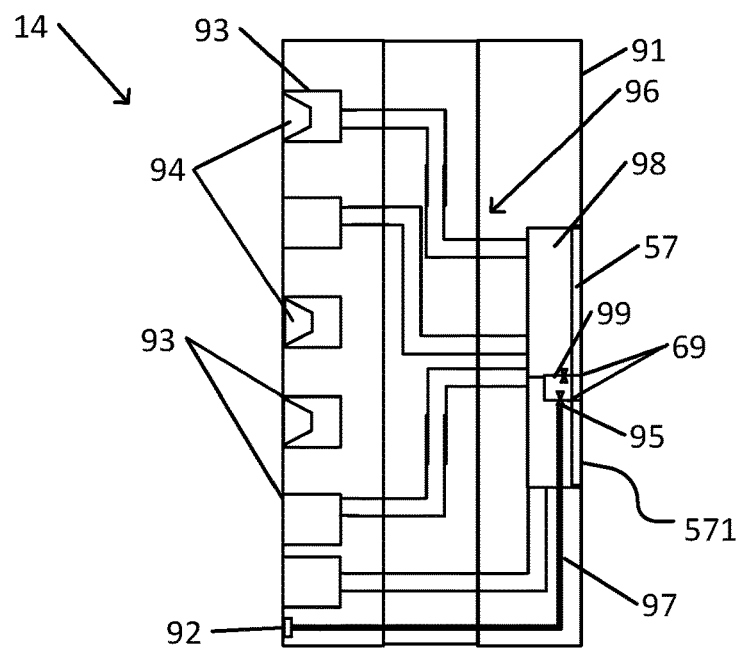
FIG. 7D is a schematic cross section of an example of a matrix droplet extruder such as that shown in FIG. 7C.
Figure 7E:
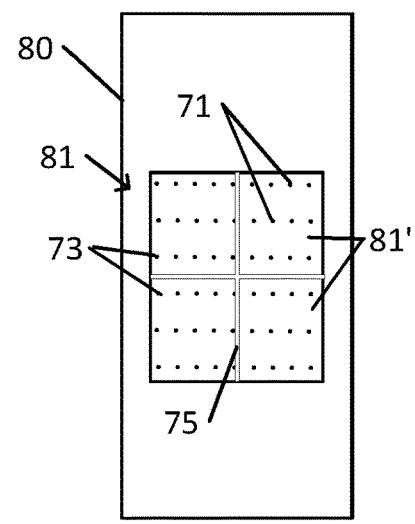
FIG. 7E schematically illustrates an example of a slide onto which reagent dots were extruded, possibly by a matrix droplet extruder such as that shown in FIG. 7A.

In some cases, as illustrated schematically in FIG. 7E, the surface of substrate 81 may be divided into two or more substrate sections 81'. For example, each substrate section 81' may be provided with a separate sealing gasket. Alternatively or in addition, substrate 81 itself may include one or more dividers 75. For example, divider 75 may be made of a material that impedes or prevents spreading of a liquid from one substrate section 81' to another. For example, different wet process steps may be applied to two or more different substrate sections 81'. In some cases, one or more substrate sections 81' may function as a reference or control section, e.g., to which one or more process steps are not applied, or to which no sample is applied.

Various liquid substances may be held within sample holder 18. Typically, sample holder 18 may include between four and seven liquid containers 84. The number of pneumatic connectors 78 may be selected so as to enable transfer of liquids from liquid containers 84 to substrate 81, with additional pneumatic connectors 78 connected to breather vents. In a non-binding example, a sample holder 18 with seven liquid containers 84 may include nine pneumatic connectors 78. Similarly, a sample holder 18 with four liquid containers 84 may include six pneumatic connectors 78.

A particular sample holder 18 may be configured for application of a particular analysis procedure or of family of similar analysis procedures, e.g., to a particular type of sample. For example, some or all sample holders 18 may be provided (e.g., by a manufacturer or user of sample holder 18) with a selection of liquid substances that are each sealed in a blister pack 85 (to be understood as including any type of sealed package that is insertable into a sample holder 18). Sealing of a liquid substance in a blister pack 85 may enable long-term storage of the liquid substance, e.g., for months or years.

Sample holder holding structure 19 of carousel 42, or a station along the perimeter of carousel 42, may include one or more pins or projections (e.g., similar to projections 61 of docking station 56, as described below) that are configured to be pressed against (e.g., by mechanical system 50) and puncture a blister pack 85 and emptying its contents into a liquid container 84 for application to substrate 81 ("wet process") during analysis of the sample in sample holder 18.

Sample slide 80 may be removed from holder casing 76, e.g., by a mechanical arm 51 or by another component of mechanical system 50. For example, substrate 81 of sample slide 80 may be placed against droplet matrix extrusion surface 571 of matrix droplet extruder 14 or may be placed into analysis module 54. Sample slide 80 (see FIGS. 6A and 6B) may include registration structure 79 to facilitate precise registration with droplet matrix extrusion surface 571 or analysis module 54.

For example, registration structure 79 may include mechanical structure (e.g., holes, indentations, pins, projections, or other mechanical structure), optical structure (e.g., reflectors, colored lines, bars, dots, patterns, or other optical structure), electromagnetic structure, or other structure to enable precise registration of sample slide 80 with cooperating structure, e.g., on droplet matrix extrusion surface 571, matrix droplet extruder 14, analysis module 54, or elsewhere.

FIG. 7A schematically illustrates a matrix droplet extruder inserted into a docking station that may be used in the transport and analysis system shown in FIG. 3A. FIG. 7B is a schematic opposing view of the docking station shown in FIG. 7A. FIG. 7C schematically illustrates a rear side of the matrix droplet extruder partially seen in FIGS. 7A and 7B. FIG. 7D is a schematic cross section of the matrix droplet extruder shown in FIG. 7C.

Docking station 56 in this example includes insertion space 67 into which a matrix droplet extruder 14 may be inserted. For example, matrix droplet extruder 14 may be handled (e.g., without contaminating droplet matrix extrusion surface 571) using pack handle 15.

Casing 91 (see FIG. 7C) of matrix droplet extruder 14 may include a plurality of docking pneumatic connectors 92 that may be connectable to docking station connectors 65 (see FIG. 7B) within insertion space 67 of docking station 56. Internal structure of matrix droplet extruder 14, e.g., within casing 91, may be controlled by pneumatic actuator assembly 58 via docking pneumatic connectors 92.

Matrix droplet extruder 14 may include a plurality of reagent containers 93 (see FIG. 7D), each for holding a liquid reagent or other liquids (e.g., cleaning liquids, hydraulic liquids, or other liquids, all of which are referred to herein as reagents for convenience and clarity). Reagent liquids may be provided in reagent canisters 94. For example, a reagent canister 94 may include a blister pack or other sealed container that may be emptied into a reagent container 93.

Prior to attachment to docking station 56, a reagent canister 94 may be placed in each or some or all of reagent containers 93, e.g., by a manufacturer, distributor, or user of matrix droplet extruder 14. A selection of reagent canisters 94 (e.g., each containing a particular liquid reagent) for insertion into reagent containers 93 may be configured for a particular facility or type of facility (e.g., clinic, mobile facility, hospital, or other type of facility) or for a particular purpose (e.g., blood test or other clinical tests, chemical evaluation of substances, or other purpose), or otherwise.

A liquid reagent may be stored in a reagent canister 94 for a long period (e.g., months or years). (It should be understood that reference herein to reagent containers, canisters, conduits, or other reagent components or structure should be understood as referring to components or structure for holding, or directing the flow of, any liquid that utilized during operation of matrix droplet extruder 14.)

After insertion of matrix droplet extruder 14 into insertion space 67, activation plate 59 of docking station 56 may be operated to prepare matrix droplet extruder 14 for operation, e.g., at the beginning of a work period (e.g., a work day), or otherwise after insertion of matrix droplet extruder 14 and prior to operation of matrix droplet extruder 14. A mechanism may push activation plate 59 forward toward the rear side (e.g., the side opposite of that which includes droplet matrix extrusion surface 571) of matrix droplet extruder 14. In the example shown, activation plate 59 may be pushed forward by application of pneumatic pressure to plate movement pneumatic connectors 63.

Activation plate 59 may include a plurality of projections 61, e.g., cylindrical pins or other projections. Pushing activation plate 59 to matrix droplet extruder 14 may insert projection 61 into a reagent canister 94. Insertion of projection 61 may rupture a part of each reagent canister 94 or otherwise force the contents of that reagent canister 94 into the reagent container 93 into which that reagent canister 94 was inserted.

Typically, a liquid reagent may be stored in a reagent container 93 for the duration of a typical work period (e.g., one day). In some cases, multiple sample analysis device 10 may be provided with refrigeration, either internal (e.g., refrigeration structure enclosed within housing 11) or external (e.g., a refrigerated case into which multiple sample analysis device 10 or matrix droplet extruder 14 may be inserted), to extend a usable lifetime of the liquid reagents (e.g., for use in a facility with a small daily throughput of samples).

In some cases, docking station 56 may be configured for separate insertion of subsets of projections 61 into a subset of reagent canisters 94. For example, docking station 56 may include a plurality of separately operable activation plates 59 or may include a mechanism for selectively extending, retracting, or otherwise operating individual projections 61 or groups of projections 61.

In addition to emptying the contents of reagent canisters 94, pushing activation plate 59 into matrix droplet extruder 14 may also cause each of docking station connectors 65 to connect to a corresponding docking pneumatic connector 92 (see FIG. 7C) on matrix droplet extruder 14. Thus, pneumatic actuator assembly 58 may be operated to provide pneumatic pressure to matrix droplet extruder 14 via docking pneumatic connectors 92.

When matrix droplet extruder 14 is to print a pattern of reagent dots via droplet matrix extrusion surface 571, pneumatic actuator assembly 58 may be operated to force a liquid reagent out of a reagent container 93, via reagent channels of channel arrangement 96 (see FIG. 7D), to or towards liquid management chip 98. Liquid management chip 98 may be controllable via a plurality of pneumatic control channels 97 of channel arrangement 96 that connect each of one or more docking pneumatic connectors 92 to one or more pneumatically operable gates 95 of liquid management chip 98.

Liquid management chip 98 may include an internal arrangement of control conduits and dispensing channels 99 so as to control and direct a flow of liquid reagents from reagent containers 93, via channel arrangement 96, to specific perforations 69 of droplet matrix extrusion surface 571. For example, channel arrangement 96 and dispensing channels 99 may be arranged so as to connect a particular reagent container 93 to one or, more typically, to a plurality of specific perforations 69 of droplet matrix extrusion surface 571. The reagent may be dispensed when pneumatic pressure is applied to the reagent, e.g., at reagent container 93. Closing a pneumatically operable gate 95 may prevent extrusion through a particular perforation 69.

In some cases, two or more reagent containers 93 may be connected to a single perforation 69. For example, one of the two or more reagent containers 93 may be filled initially, while another is filled when the first is emptied or when a predetermined period of time has passed since being opened. In some cases, a cleaning fluid may be extruded via perforation 69 between successive extrusions of reagent from the different reagent containers 93.

In some cases, extrusion of two or more different reagents via a single perforation 69 may enable formation of a droplet that includes a mixture or other combination of both reagents. For example, a perforation 69 may be elongated to enable connection to two or more dispensing channels 99. As another example, droplet matrix extrusion surface 571 may include grooves or other structure that enables or facilitates mixing (e.g., via one or more channeling effects) between different reagents that are extruded by two or more separate but neighboring perforations 69.

Liquid management chip 98 may be controlled by pneumatic actuator assembly 58 (see indicated in FIGS. 3 and 4) to direct a particular liquid reagent from a selected reagent container 93 to one or more selected perforations 69 on droplet matrix extrusion surface 571. The liquid reagent may be extruded via that perforation 69, e.g., to print that reagent onto a sample on substrate 81 of a sample slide 80.

FIG. 7E schematically illustrates an example of a slide onto which reagent dots were extruded.

In the example shown, reagent dots 71 have been printed on substrate 81. Although, in the example shown, substrate 81 is divided by dividers 75 into multiple substrate sections 81', substrate 81 may be a single undivided surface (e.g., membrane). In the example shown, reagent dots 71 are organized into dot rows 73, where the separation between neighboring dot rows 73 is here optionally greater than the separation between adjacent reagent dots 71 in a single dot row 73. For example, each dot row 73 may include reagent dots 71 of a single reagent (e.g., where any mixing between adjacent reagent dots 71 is less likely to affect results), while different dot rows 73 may be of different reagents where mixing is to be avoided.

Alternatively or in addition to organization of reagent dots 71 into separate dot rows 73, groups of reagent dots 71 may be organized into separated columns, clusters, or otherwise, or without separations between groups. In other examples, parts of substrate 81 may be coated or infused with a liquid repellent (e.g., using a solid ink printer) to limit absorption to predetermined regions of substrate 81 (e.g., to create separate assay regions on substrate 81).

Figure 8:
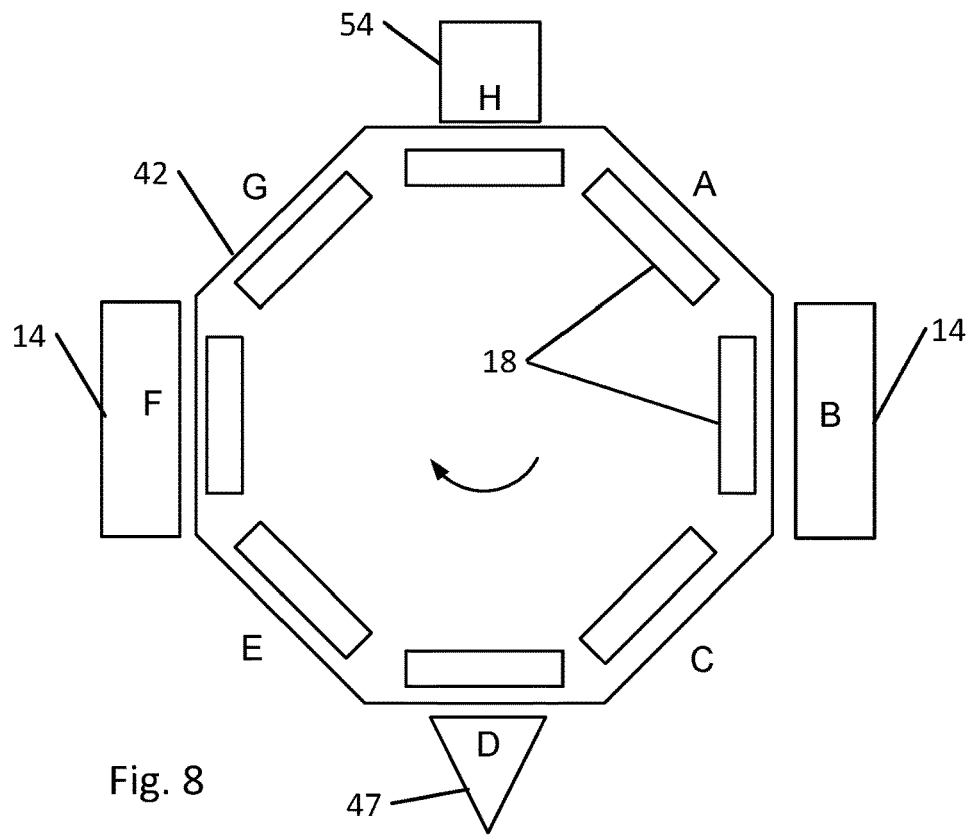
FIG. 8 schematically illustrates possible stations for sample holders of an example of a transport and analysis system such as that shown in FIG. 3A.

FIG. 8 schematically illustrates transport of sample holders to stations of the transport and analysis system shown in FIG. 3.

Stations A-H are distributed about the perimeter of carousel 42. Transport mechanism 70 may be configured to rotate in the direction shown by the arrow to transport each loaded sample holder 18 from one of stations A-H to a succeeding station B-A, respectively. After a sample holder 18 is transported to a succeeding station, carousel 42 remains stationary (e.g., does not rotate) for a predetermined period of time.

Figure 9:
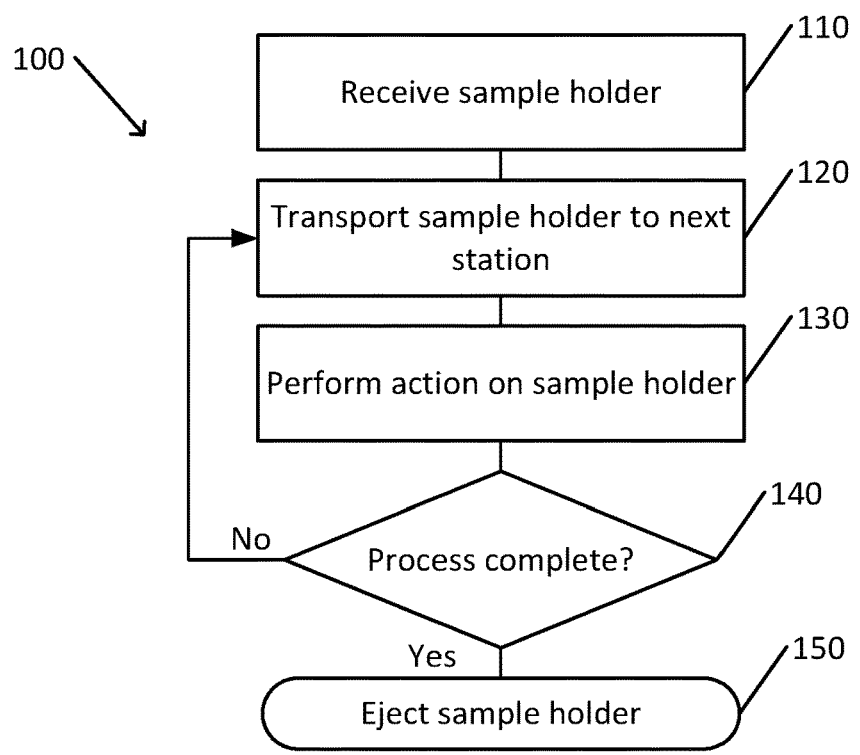
FIG. 9 is a flowchart depicting a possible method of operation of a multiple sample analysis device, in accordance with an embodiment of the present invention.

FIG. 9 is a flowchart depicting a method of operation of a multiple sample analysis device, in accordance with an embodiment of the present invention.

It should be understood with respect to any flowchart referenced herein, that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

POC sample analysis method 100 may be executed by a processor, such as processor 36 of multiple sample analysis device 10, or by another processor in communication with processor 36 or with multiple sample analysis device 10.

A sample holder 18 may be received (block 110). For example, sample holder 18 may have been loaded into multiple sample analysis device 10 via sample holder insertion opening 16, and may have been loaded onto transport mechanism 70, e.g., carousel 42. In the example shown in FIG. 8, a sample holder 18 is loaded onto carousel 42 at station D, e.g., via loading mechanism 47.

Each sample holder 18 is transported by transport mechanism 70 to a succeeding station (block 120), where the sample holder 18 remains for a predetermined period of time (e.g., one minute, or another appropriate period of time). For example, a sample holder 18 that was loaded onto carousel 42 at station D may be transported to station E. The other sample holders 18 on carousel 42 are similarly transported to a succeeding station.

An action may be performed on a sample holder 18 that is remaining at each of the stations for the predetermined period of time (block 130). The action that is performed may depend on a current step of an analysis process that is being performed on the sample held in each sample holder 18.

For example, steps of an ELISA protocol may begin to be applied to a sample in a sample holder 18 when that sample holder 18 is at station A. Succeeding steps of the ELISA protocol may be performed at each succeeding station B-G (depending on the type or ELISA protocol, e.g., indirect or sandwich Elisa protocol). In this case, and when the sample is a blood sample, the blood may be caused to flow from sample channels 82 through blood separator 89 at each of stations E-H between loading of sample holder 18 at station D and application of the first step of the ELISA protocol at station A.

In some cases, the performed action may include waiting at the station without any processing of the sample held in sample holder 18. In some cases, waiting at a station may provide an incubation step of an ELISA protocol.

In some cases, the action may include placement of the sample into contact with an array of reagent droplets on a droplet matrix extrusion surface 571 of a matrix droplet extruder 14, at station B or F in the example shown. When a sample holder 18 has been transported to station B or F, mechanical arms 51 may lift sample slide 80 out of sample holder 18 and place substrate 81 into contact with droplet matrix extrusion surface 571. For example, when the sample includes, or is suspected of including, one or more specific antigens, the array of reagent droplets may include one or more specific detection antibodies to which detection molecules (e.g., a fluorescent or other dye, such a horseradish peroxidase) have been attached. Typically, the specific contents of each reagent droplet is duplicated, e.g., in a row or column of adjacent reagent droplets.

Following removal of slide 80 from droplet matrix extrusion surface 571, mechanical system 50 may place rinsing chamber 68 over droplet matrix extrusion surface 571. Pneumatic actuator assembly 58 may then be operated to cause a cleaning fluid to flow from a cleaning fluid reservoir of matrix droplet extruder 14 via a cleaning fluid inlet into rinsing chamber 68. After a predetermined period of time, pneumatic actuator assembly 58 may be operated to drain the cleaning fluid from rinsing chamber 68 via a cleaning fluid outlet into a waste fluid reservoir of matrix droplet extruder 14. Mechanical system 50 may remove rinsing chamber 68 from droplet matrix extrusion surface 571.

At at least some stations, a sample may be subjected to one or more wet processes. For example, a substrate 81 to which an ELISA protocol is applied may be subjected to one or more coating, washing, blocking, or other steps. In particular, a coating step may include coating with the sample, or coating with a capture antibody prior to coating with the sample.

When a sample holder 18 is transported to a station that includes analysis module 54 (station H in the example shown), e.g., after some or all processing steps have been applied to the sample, the sample may be examined by analysis module 54. For example, mechanical system 50 may be controlled to lift sample slide 80 out of sample holder 18 so that sample slide 80, or at least substrate 81, is inserted into analysis module 54, e.g., a light tight chamber of analysis module 54.

Analysis module 54 may then be operated to acquire one or more images of the substrate 81, e.g., under various types of illumination, or fluorescence of substrate 81. Alternatively or in addition, analysis module 54 may apply electronics to measure one or more electrical properties of the locations on substrate 81. The analysis may include determining a correspondence of a result at each location on substrate 81 with a reagent with which substrate 81 was placed into contact at that location.

Analysis may include mapping a measured property of the substrate within a reagent dot (e.g., which may have an irregular shape). The analysis may include combining measurements at different points of a reagent dot, or different reagent dots of the same reagent, to calculate a statistically significant result. The analysis may include preparing a report that summarizes the results of the analysis.

If all actions on a sample holder 18 are complete (block 140), mechanical system 50 may be operated to remove that sample holder 18 from carousel 42 and to eject it from multiple sample analysis device 10 (block 150). Typically, the final action performed on a sample holder 18 is examination of its sample slide 80 by analysis module 54.

If additional actions remain to be performed on a sample holder 18 (block 140), that sample holder 18 is transported to the next station (block 120), and an additional action may be performed (block 130).

A matrix droplet extruder 14 may be incorporated into a standalone reagent dot printing system for preprinting reagent dots on a sample slide 80. Similarly, a preprinted slide may be incorporated into a sample holder 18 for use with a standalone sample analysis system.

Figure 10:
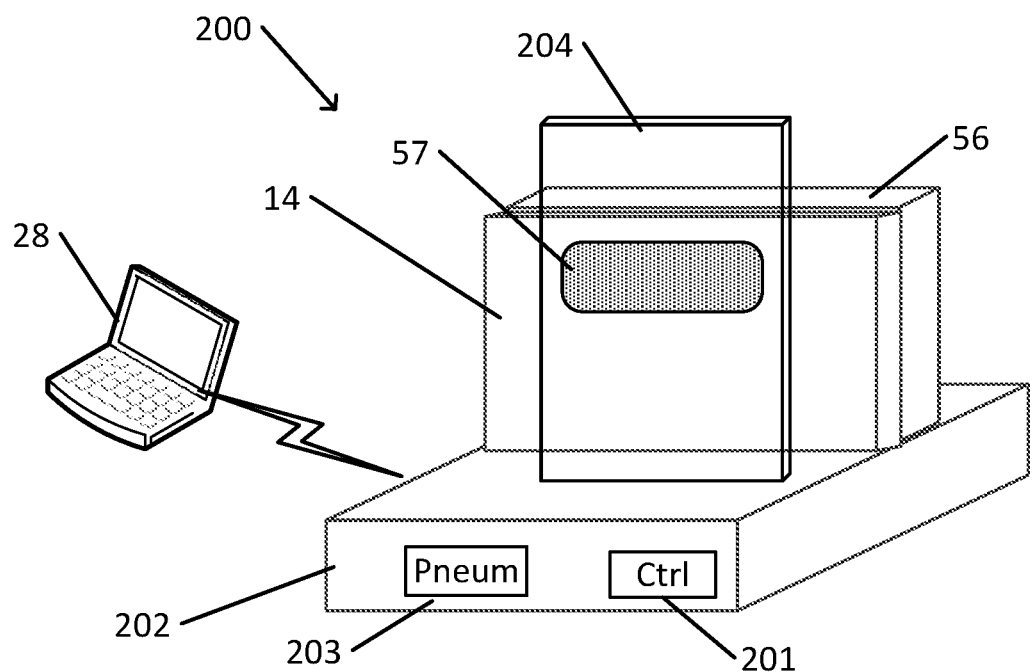
FIG. 10 schematically illustrates an example of a reagent dot printing system.

FIG. 10 schematically illustrates an example of a reagent dot printing system.

Reagent dot printing system 200 may be utilized to print an array of reagent dots 71 on a surface. In particular, reagent dot printing system 200 may be operated to print an array of reagent dots 71 on a slide to produce a preprinted sample slide 204 on which reagent dots 71 are pre-extruded. As used herein, pre-extruded refers to extrusion of reagent droplets onto substrate 81 prior to introduction of the sample onto that substrate 81.

For example, dot printing device 202 may incorporate a docking station 56. Dot printing device 202 may include one or more pneumatic actuators 203 and conduits for operation of a matrix droplet extruder 14 that is connected to docking station 56. Dot printing device 202 may incorporate or may communicate with a controller 201 for controlling operation of the pneumatic actuators. For example, controller 201 may be configured to control a pressure that is generated by pressure generator 60 (not shown in FIG. 10) of pneumatic actuators 203 and that is applied to one or more docking pneumatic connectors 92 of matrix droplet extruder 14, or time of operation of the pressure generator 60 or a period of time during which the pressure is applied to one or more docking pneumatic connectors 92.

In some cases, dot printing device 202 may be provided with user operable controls for controlling operation of dot printing device 202. In some cases, operation of dot printing device 202 may be controlled via an external device 28 (e.g., computer, smartphone, or other device) that communicates with dot printing device 202 via a wired or wireless connection.

For example, dot printing device 202 may be operated (e.g., by a pharmacist, physician, or other trained user) to produce a preprinted sample slide 204. Typically, dot printing device 202 may be operated to produce a plurality of preprinted sample slides 204 that are designed for use by a particular user (person or institution), under particular circumstances (e.g., for application of a particular protocol, or for detection of a particular physiological disorder, toxin, contaminant, or other component of a liquid sample), geographic location (e.g., where particular conditions are prevalent), or other particular application.

Preprinted sample slides 204 may be immediately inserted into sample holders 18 or stored separately for later insertion into sample holders 18 or for other uses. Storage of preprinted sample slides 204, or of sample holders 18 into which preprinted sample slides 204 have been inserted, may be under controlled conditions designed to preserve the integrity of reagent dots that are printed onto preprinted sample slide 204.

Figure 11:
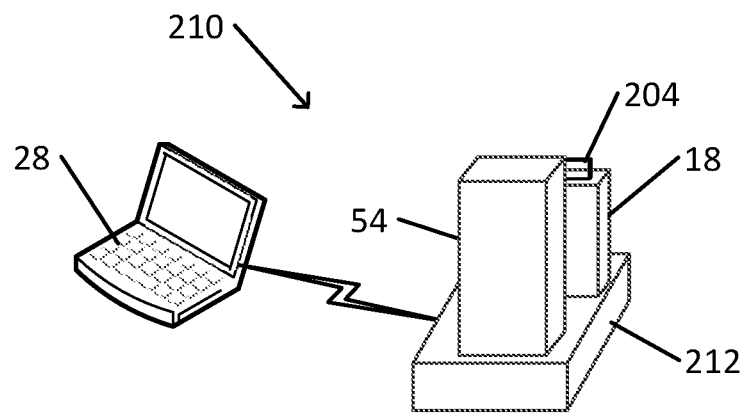
FIG. 11 schematically illustrates an example of a stand-alone sample processing system.

FIG. 11 schematically illustrates an example of a standalone sample processing system.

Sample processing system 210 is configured to perform one or more process steps, and, in particular, wet process steps, on a sample that is introduced into sample holder 18. For example, sample processing device 212 may include pneumatic actuators to cause liquid flow of one or more samples or other liquids within sample holder 18 that is inserted into sample processing device 212.

When a sample holder 18 includes a preprinted sample slide 204, the processed sample may interact with the reagent dots on preprinted sample slide 204 to produce an optically assessable result (e.g., color change or fluorescence). Typically, sample processing device 212 includes an analysis module 54 for optically or electronically examining a preprinted sample slide 204 after the processing that occurs within a sample holder 18 that is inserted into sample processing device 212. In some cases, sample processing device 212 may include a mechanical system (e.g., with some components of mechanical system 50 as described above) to remove preprinted sample slide 204 from sample holder 18. In other cases, a user may remove preprinted sample slide 204 from sample holder 18 for analysis by analysis module 54.

For example, sample processing device 212 may be utilized by a private user (e.g., a patient) or other user who does not need to analyze a large number of samples. Thus, a user of sample processing device 212 may purchase preprinted sample slides 204 for a particular test, or for a limited number of tests, and utilize appropriate sample holders 18 to perform the appropriate wet process steps on the sample.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A matrix droplet extruder comprising:
   a casing;
   one or a plurality of reagent containers;
   a plurality of pneumatic connectors on the casing that are each connectable to a corresponding docking station connector of a plurality of pneumatic docking station connectors of a docking station that is connectable to a pneumatic generator controllable by a controller, wherein the controller is configured to controllably provide pneumatic pressure to one or more of said plurality of the pneumatic docking station connectors;
   a droplet matrix extrusion surface with an array of perforations; and
   a liquid management chip having a network of dispensing channels for dispensing one or more reagents from said one or a plurality of reagent containers through the array of perforations, and a pneumatic control network comprising pneumatic channels and gates, which are configured to be controlled by application of the pneumatic pressure to the gates via the pneumatic channels to enable or block dispensing said one or more reagents to repeatedly generate a matrix of droplets when applying the pneumatic pressure to said one or more reagents.

2. The matrix droplet extruder of claim 1, wherein the droplet matrix extrusion surface comprises a pattern for allowing mixing of two or more droplets.

3. The matrix droplet extruder of claim 1, further comprising a reservoir for holding a cleaning fluid.

4. The matrix droplet extruder of claim 3, wherein the droplet matrix extrusion surface comprises a cleaning fluid inlet for enabling the cleaning fluid to flow from the reservoir to the droplet matrix extrusion surface and a cleaning fluid outlet to enable the cleaning fluid to flow from the droplet matrix extrusion surface to a waste fluid reservoir of the matrix droplet extruder.

5. The matrix droplet extruder of claim 1, wherein a reagent container of the plurality of reagent containers is configured to hold a reagent canister of a reagent to fill that reagent container.

6. A matrix droplet generator comprising:
   a pneumatic pressure generator;
   a controller configured to control the pneumatic pressure generator;
   a docking station having a plurality of pneumatic docking station connectors connected to the pneumatic pressure generator; and
   a matrix droplet extruder comprising:
      a casing;
      one or a plurality of reagent containers;
      a plurality of pneumatic connectors on the casing that are each connectable to a corresponding docking station connector of the plurality of pneumatic docking station connectors, and wherein the controller is programmed to controllably provide pneumatic pressure to one or more of said plurality of the pneumatic docking station connectors;
      a droplet matrix extrusion surface with an array of perforations; and
      a liquid management chip having a network of dispensing channels for dispensing one or more reagents from said one or a plurality of reagent containers through the array of perforations, and a pneumatic control network comprising pneumatic channels and gates, which are configured to be controlled by the pneumatic pressure to enable or block dispensing said one or more reagents using the pneumatic pressure to repeatedly generate a matrix of droplets.

7. The matrix droplet generator of claim 6, wherein the controller is configured to control a period of time during which pressure is applied by the pressure generator to a pneumatic connector of the plurality of pneumatic connectors.

8. The matrix droplet generator of claim 6, wherein the controller is configured to control a pressure that is applied by the pressure generator to a pneumatic connector of the plurality of pneumatic connectors.

* * * * *